United States Patent
Zou

(10) Patent No.: US 10,776,215 B2
(45) Date of Patent: *Sep. 15, 2020

(54) SNAPSHOT GENERATING METHOD, SYSTEM, AND APPARATUS

(71) Applicant: HUAWEI TECHNOLOGIES CO., LTD., Shenzhen, Guangdong (CN)

(72) Inventor: Fengshao Zou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 5 days.

This patent is subject to a terminal disclaimer.

(21) Appl. No.: 16/047,984

(22) Filed: Jul. 27, 2018

(65) Prior Publication Data

US 2018/0357134 A1 Dec. 13, 2018

Related U.S. Application Data

(63) Continuation of application No. 14/539,343, filed on Nov. 12, 2014, now Pat. No. 10,061,656, which is a continuation of application No. PCT/CN2013/087527, filed on Nov. 20, 2013.

(51) Int. Cl.
G06F 11/14 (2006.01)

(52) U.S. Cl.
CPC ...... *G06F 11/1461* (2013.01); *G06F 11/1407* (2013.01); *G06F 11/1464* (2013.01); *G06F 11/1484* (2013.01); *G06F 2201/815* (2013.01); *G06F 2201/84* (2013.01)

(58) Field of Classification Search
CPC ............ G06F 11/1461; G06F 11/1464; G06F 11/1407
See application file for complete search history.

(56) References Cited

U.S. PATENT DOCUMENTS

| 7,093,086 B1 | 8/2006 | Van Rietschote |
| 7,318,135 B1 | 1/2008 | Tormasov et al. |
| 8,239,646 B2 | 8/2012 | Colbert et al. |
| 8,458,419 B2 | 6/2013 | Basler et al. |
| 8,498,966 B1 | 7/2013 | Waghole |

(Continued)

FOREIGN PATENT DOCUMENTS

| CN | 101421715 A | 4/2009 |
| CN | 101443748 A | 5/2009 |
| CN | 102541658 A | 7/2012 |

*Primary Examiner* — Huawen A Peng
(74) *Attorney, Agent, or Firm* — Kilpatrick Townsend & Stockton LLP

(57) ABSTRACT

Embodiments of the present invention relate to a snapshot generating method, computer system, and apparatus, which can determine a plurality of virtual machines where an application runs and a deployment server where the plurality of virtual machines is deployed, and send a snapshot instruction to the deployment server of the plurality of virtual machines, so that the deployment server of the plurality of virtual machines can start snapshot operations on the plurality of virtual machines at consistent time points according to the snapshot instruction, so as to generate snapshot files of the plurality of virtual machines at the consistent time points, thereby implementing unified snapshots on the plurality of virtual machines where the application runs and ensuring consistency among backup data of the application.

8 Claims, 12 Drawing Sheets

(56) References Cited

U.S. PATENT DOCUMENTS

| | | |
|---|---|---|
| 2007/0244938 A1 | 10/2007 | Michael et al. |
| 2007/0260831 A1 | 11/2007 | Michael et al. |
| 2009/0037680 A1 | 2/2009 | Colbert et al. |
| 2009/0216816 A1 | 8/2009 | Basler et al. |
| 2010/0299309 A1 | 11/2010 | Maki et al. |
| 2011/0113206 A1 | 5/2011 | Heim |
| 2012/0201317 A1 | 8/2012 | Hassan et al. |
| 2012/0203742 A1 | 8/2012 | Goodman et al. |
| 2013/0339643 A1* | 12/2013 | Tekade ................ G06F 11/1461 711/162 |

* cited by examiner

SNAPSHOT GENERATING METHOD, SYSTEM, AND APPARATUS

CROSS-REFERENCE TO RELATED APPLICATIONS

This application is a continuation of U.S. patent application Ser. No. 14/539,343, filed on Nov. 12, 2014, which is a continuation of International Application No. PCT/CN2013/087527, filed on Nov. 20, 2013. Both of the aforementioned applications are hereby incorporated by reference in their entireties.

TECHNICAL FIELD

The present invention relates to computer technologies, and in particular, to a snapshot generating method, system, and apparatus.

BACKGROUND

A virtualization technology integrates a plurality of operating systems into one high-performance deployment server, which maximizes the utilization of all resources of a hardware platform and can implement more applications with less investment. This can not only simplify a system architecture, but also reduce the difficulty of resource management, the technology is widely applied to computer systems.

In a virtualized computer system, an application is deployed on one or more virtual machines. When the application is deleted or is damaged because of an irresistible natural disaster such as a fire, an earthquake, or a war, if no effective action is taken to back up data of the application in advance, it may cause that the application is interrupted and data is lost in the entire computer system and even the application cannot be recovered, which brings great loss.

In the prior art, backup and disaster recovery are performed on an application running on virtual machines. An administrator determines the virtual machines where the application runs and creates snapshots for the virtual machines one by one, and finally, obtains backup data of the virtual machines according to the snapshots of the virtual machines. In the prior art, manual operations are used to determine application-related virtual machines and perform snapshot operations with a granularity of a virtual machine. If the administrator fails to determine all virtual machines, it is possible that backup of the data of the application be incomplete. Even in a case in which all virtual machines are determined, it is also possible that snapshot data of the virtual machines be inconsistent.

SUMMARY

Embodiments of the present invention provide a snapshot generating method, system, and apparatus, so as to implement consistency among snapshot data of an application.

According to a first aspect, an embodiment of the present invention provides a snapshot generating method, where the method includes receiving a snapshot creation request for an application, where the snapshot creation request for the application carries an identifier of the application and is used to instruct that a snapshot be created for data of the application; determining, according to the identifier of the application, a plurality of virtual machines where the application runs; determining a deployment server of the plurality of virtual machines; and sending a snapshot instruction to the deployment server of the plurality of virtual machines, where the snapshot instruction is used to instruct the deployment server to perform consistent snapshot operations on data of the plurality of virtual machines, so as to generate snapshot files of the plurality of virtual machines.

With reference to the first aspect, in a first possible implementation manner, the snapshot creation request for the application further carries instruction information, where the instruction information is used to instruct that the consistent snapshot operations be performed on the data of the application; and then the sending a snapshot instruction to the deployment server of the plurality of virtual machines includes sending the snapshot instruction to the deployment server of the plurality of virtual machines according to the instruction information.

With reference to the first aspect, in a second possible implementation manner, the method further includes presetting a snapshot policy of the application, where the snapshot policy of the application instructs that the consistent snapshot operations be performed on the data of the application, and then the sending a snapshot instruction to the deployment server of the plurality of virtual machines includes sending the snapshot instruction to the deployment server of the plurality of virtual machines according to the snapshot policy of the application.

With reference to the first aspect, the first possible implementation manner of the first aspect, or the second possible implementation manner of the first aspect, in a third possible implementation manner, when it is determined that the plurality of virtual machines is deployed on a plurality of deployment servers, the sending a snapshot instruction to the deployment server of the plurality of virtual machines includes sending the snapshot instruction separately to the plurality of deployment servers at a same time point, where the snapshot instruction carries an identifier of a virtual machine deployed on each deployment server and first information, where the first information indicates that the snapshot operation has a high processing priority; or sending the snapshot instruction separately to the plurality of deployment servers, where the snapshot instruction carries an identifier of a virtual machine deployed on each deployment server and second information, where the second information instructs that the snapshot operation be started at a same time.

According to a second aspect, an embodiment of the present invention provides a snapshot generating method, where the method includes receiving a backup instruction, where the backup instruction carries an identifier of the application and is used to instruct that data of the application be backed up; and sending a snapshot creation request for an application to a cloud operation server, where the snapshot creation request for the application carries the identifier of the application and instruction information, where the instruction information is used to instruct that consistent snapshot operations be performed on the data of the application.

With reference to the second aspect, in a first possible implementation manner, the receiving a backup instruction includes receiving the backup instruction that is triggered by a user, where the backup instruction carries the identifier of the application; or generating the backup instruction in a timed manner according to a preset backup policy of the application, where the backup instruction carries the identifier of the application.

According to a third aspect, an embodiment of the present invention provides a snapshot generating method, where the method includes receiving a snapshot creation request for virtual machines, where the snapshot creation request for the virtual machines carries identifiers of a plurality of virtual machines and instruction information, where the instruction information is used to instruct that consistent snapshot operations be performed on data of the plurality of virtual machines; determining a deployment server of the plurality of virtual machines; and sending a snapshot instruction to the deployment server of the plurality of virtual machines according to the instruction information, where the snapshot instruction is used to instruct the deployment server of the plurality of virtual machines to perform the consistent snapshot operations on the data of the plurality of virtual machines, so as to generate snapshot files of the plurality of virtual machines.

With reference to the third aspect, in a first possible implementation manner, when it is determined that the plurality of virtual machines is deployed on a plurality of deployment servers, the sending a snapshot instruction to the deployment server of the plurality of virtual machines includes sending the snapshot instruction separately to the plurality of deployment servers at a same time point, where the snapshot instruction carries an identifier of a virtual machine deployed on each deployment server and first information, where the first information indicates that the snapshot operation has a high processing priority; or sending the snapshot instruction separately to the plurality of deployment servers, where the snapshot instruction carries an identifier of a virtual machine deployed on each deployment server and second information, where the second information instructs that the snapshot operation be started at a same time.

According to a fourth aspect, an embodiment of the present invention provides a snapshot generating method, where the method includes receiving a backup instruction, where the backup instruction carries an identifier of the application and is used to instruct that data of the application be backed up; determining, according to the identifier of the application, a plurality of virtual machines where the application runs; and sending a snapshot creation request for virtual machines to a cloud operation server, where the snapshot creation request for the virtual machines carries identifiers of the plurality of virtual machines and instruction information, where the instruction information is used to instruct that consistent snapshot operations be performed on data of the plurality of virtual machines.

With reference to the fourth aspect, in a first possible implementation manner, the receiving a backup instruction includes receiving the backup instruction that is triggered by a user, where the backup instruction carries the identifier of the application; or generating the backup instruction in a timed manner according to a preset backup policy of the application, where the backup instruction carries the identifier of the application.

According to a fifth aspect, an embodiment of the present invention provides a snapshot generating method, where the method includes receiving a backup instruction, where the backup instruction carries an identifier of the application and is used to instruct that data of the application be backed up; determining, according to the identifier of the application, a plurality of virtual machines where the application runs; determining a deployment server of the plurality of virtual machines; and sending a snapshot instruction to the deployment server of the plurality of virtual machines, where the snapshot instruction is used to instruct the deployment server to perform the consistent snapshot operations on data of the plurality of virtual machines, so as to generate snapshot files of the plurality of virtual machines.

With reference to the fifth aspect, in a first possible implementation manner, when it is determined that the plurality of virtual machines is deployed on a plurality of deployment servers, the sending a snapshot instruction to the deployment server of the plurality of virtual machines includes sending the snapshot instruction separately to the plurality of deployment servers at a same time point, where the snapshot instruction carries an identifier of a virtual machine deployed on each deployment server and first information, where the first information indicates that the snapshot operation has a high processing priority; or sending the snapshot instruction separately to the plurality of deployment servers, where the snapshot instruction carries an identifier of a virtual machine deployed on each deployment server and second information, where the second information instructs that the snapshot operation be started at a same time.

With reference to the fifth aspect or the first possible implementation manner of the fifth aspect, in a second possible implementation manner, the receiving a backup instruction includes receiving the backup instruction that is triggered by a user, where the backup instruction carries the identifier of the application and instruction information, where the instruction information is used to instruct that the consistent snapshot operations be performed on the data of the application; and the sending a snapshot instruction to the deployment server of the plurality of virtual machines includes sending the snapshot instruction to the deployment server of the plurality of virtual machines according to the instruction information.

With reference to the second possible implementation manner of the fifth aspect, in a third possible implementation manner, the method further includes presetting a backup policy of the application and a snapshot policy of the application, where the snapshot policy of the application instructs that the consistent snapshot operations be performed on the data of the application; then the receiving a backup instruction includes generating the backup instruction in a timed manner according to the backup policy of the application, where the backup instruction carries the identifier of the application; and the sending a snapshot instruction to the deployment server of the plurality of virtual machines includes sending the snapshot instruction to the deployment server of the plurality of virtual machines according to the snapshot policy of the application.

According to a sixth aspect, an embodiment of the present invention provides a snapshot generating method, where the method includes receiving a snapshot instruction, where the snapshot instruction is used to instruct that consistent snapshot operations be performed on a plurality of virtual machines; suspending a write operation on each virtual machine at a consistent time point according to the snapshot instruction; and taking a snapshot on a storage volume of each virtual machine, so as to generate a snapshot file of each virtual machine.

With reference to the sixth aspect, in a first possible implementation manner, the snapshot instruction carries identifiers of the virtual machines and first information, where the first information indicates that the snapshot operation has a high processing priority; and the suspending a write operation on each virtual machine at a consistent time point according to the snapshot instruction includes suspending, according to the fact that the snapshot operation has a high processing priority, the write operation on each virtual machine immediately when the snapshot instruction is received.

With reference to the sixth aspect, in a second possible implementation manner, the snapshot instruction carries identifiers of the virtual machines and second information, where the second information instructs that the snapshot operation be started at a same time; and the suspending a write operation on each virtual machine at a consistent time point according to the snapshot instruction includes suspending the write operation on each virtual machine at the same time according to the second information.

According to a seventh aspect, an embodiment of the present invention provides a snapshot generating apparatus, where the apparatus includes a receiving unit configured to receive a snapshot creation request for an application, where the snapshot creation request for the application carries an identifier of the application and is used to instruct that a snapshot be created for data of the application; a determining unit configured to determine, according to the identifier of the application, a plurality of virtual machines where the application runs and determine a deployment server of the plurality of virtual machines; and a sending unit configured to send a snapshot instruction to the deployment server of the plurality of virtual machines, where the snapshot instruction is used to instruct the deployment server to perform consistent snapshot operations on data of the plurality of virtual machines, so as to generate snapshot files of the plurality of virtual machines.

With reference to the seventh aspect, in a first possible implementation manner, the snapshot creation request for the application further carries instruction information, where the instruction information is used to instruct that the consistent snapshot operations be performed on the data of the application; and the sending unit is configured to send the snapshot instruction to the deployment server of the plurality of virtual machines according to the instruction information.

With reference to the seventh aspect, in a second possible implementation manner, the apparatus further includes a configuring unit configured to preset a snapshot policy of the application, where the snapshot policy of the application instructs that the consistent snapshot operations be performed on the data of the application, and the sending unit is configured to send the snapshot instruction to the deployment server of the plurality of virtual machines according to the snapshot policy of the application preset by the configuring unit.

With reference to the seventh aspect, the first possible implementation manner of the seventh aspect, or the second possible implementation manner of the seventh aspect, in a third possible implementation manner, the determining unit is configured to determine that the plurality of virtual machines is deployed on a plurality of deployment servers; and then the sending unit is configured to send the snapshot instruction separately to the plurality of deployment servers at a same time point, where the snapshot instruction carries an identifier of a virtual machine deployed on each deployment server and first information, where the first information indicates that the snapshot operation has a high processing priority; or the sending unit is configured to send the snapshot instruction separately to the plurality of deployment servers, where the snapshot instruction carries an identifier of a virtual machine deployed on each deployment server and second information, where the second information instructs that the snapshot operation be started at a same time.

According to an eighth aspect, an embodiment of the present invention provides a snapshot generating apparatus, where the apparatus includes a receiving unit configured to receive a backup instruction, where the backup instruction carries an identifier of the application and is used to instruct that data of the application be backed up; and a sending unit configured to send a snapshot creation request for an application to a cloud operation server according to the backup instruction received by the receiving unit, where the snapshot creation request for the application carries the identifier of the application and instruction information, where the instruction information is used to instruct that consistent snapshot operations be performed on the data of the application.

With reference to the eighth aspect, in a first possible implementation manner, the receiving unit is configured to receive the backup instruction that is triggered by a user, where the backup instruction carries the identifier of the application; or generate the backup instruction in a timed manner according to a preset backup policy of the application, where the backup instruction carries the identifier of the application.

According to a ninth aspect, an embodiment of the present invention provides a snapshot generating apparatus, where the apparatus includes a receiving unit configured to receive a snapshot creation request for virtual machines, where the snapshot creation request for the virtual machines carries identifiers of a plurality of virtual machines and instruction information, where the instruction information is used to instruct that consistent snapshot operations be performed on data of the plurality of virtual machines; a determining unit configured to determine a deployment server of the plurality of virtual machines; and a providing unit configured to send a snapshot instruction to the deployment server of the plurality of virtual machines according to the instruction information in the snapshot creation request for the virtual machines which is received by the receiving unit, where the snapshot instruction is used to instruct that the consistent snapshot operations be performed on the data of the plurality of virtual machines, so as to generate snapshot files of the plurality of virtual machines.

With reference to the ninth aspect, in a first possible implementation manner, the determining unit is configured to determine that the plurality of virtual machines is deployed on a plurality of deployment servers; and then the providing unit is configured to send the snapshot instruction separately to the plurality of deployment servers at a same time point, where the snapshot instruction carries an identifier of a virtual machine deployed on each deployment server and first information, where the first information indicates that the snapshot operation has a high processing priority; or the providing unit is configured to send the snapshot instruction separately to the plurality of deployment servers, where the snapshot instruction carries an identifier of a virtual machine deployed on each deployment server and second information, where the second information instructs that the snapshot operation be started at a same time.

According to a tenth aspect, an embodiment of the present invention provides a snapshot generating apparatus, where the apparatus includes a receiving unit configured to receive a backup instruction, where the backup instruction carries an identifier of the application and is used to instruct that data of the application be backed up; a querying unit configured to determine, according to the identifier of the application, a plurality of virtual machines where the application runs; and a sending unit configured to send a snapshot creation request for virtual machines to a cloud operation server, where the snapshot creation request for the virtual machines carries identifiers of the plurality of virtual machines and instruction information, where the instruction information is used to instruct that consistent snapshot operations be performed on data of the plurality of virtual machines.

According to an eleventh aspect, an embodiment of the present invention provides a snapshot generating apparatus, where the apparatus includes a receiving unit configured to receive a backup instruction, where the backup instruction carries an identifier of the application and is used to instruct that data of the application be backed up; a determining unit configured to determine, according to the identifier of the application, a plurality of virtual machines where the application runs and a deployment server of the plurality of virtual machines; and a sending unit configured to send a snapshot instruction to the deployment server of the plurality of virtual machines, where the snapshot instruction is used to instruct that consistent snapshot operations be performed on data of the plurality of virtual machines, so as to generate snapshot files of the plurality of virtual machines.

With reference to the eleventh aspect, in a first possible implementation manner, the determining unit is configured to determine that the plurality of virtual machines is deployed on a plurality of deployment servers; and then the sending unit is configured to send the snapshot instruction separately to the plurality of deployment servers at a same time point, where the snapshot instruction carries an identifier of a virtual machine deployed on each deployment server and first information, where the first information indicates that the snapshot operation has a high processing priority; or the sending unit is configured to send the snapshot instruction separately to the plurality of deployment servers, where the snapshot instruction carries an identifier of a virtual machine deployed on each deployment server and second information, where the second information instructs that the snapshot operation be started at a same time.

According to a twelfth aspect, an embodiment of the present invention provides a snapshot generating apparatus, where the apparatus includes a receiving unit configured to receive a snapshot instruction, where the snapshot instruction is used to instruct that consistent snapshot operations be performed on a plurality of virtual machines; and a snapshot unit configured to suspend a write operation on each virtual machine at a consistent time point according to the snapshot instruction, and take a snapshot on a storage volume of each virtual machine, so as to generate a snapshot file of each virtual machine.

According to a thirteenth aspect, an embodiment of the present invention provides a snapshot generating system, where the system includes a backup server configured to send a snapshot creation request for an application to a cloud operation server, where the snapshot creation request for the application carries an identifier of the application and is used to instruct that a snapshot be created for data of the application; the cloud operation server configured to receive the snapshot creation request for the application and determine, according to the identifier of the application, a plurality of virtual machines where the application runs, determine a deployment server of the plurality of virtual machines, and send a snapshot instruction to the deployment server of the plurality of virtual machines, where the snapshot instruction is used to instruct the deployment server to perform consistent snapshot operations on data of the plurality of virtual machines, so as to generate snapshot files of the plurality of virtual machines; and the deployment server configured to receive the snapshot instruction, suspend a write operation on each virtual machine at a consistent time point according to the snapshot instruction, and take a snapshot on a storage volume of each virtual machine, so as to generate a snapshot file of each virtual machine.

According to a fourteenth aspect, an embodiment of the present invention provides a snapshot generating system, where the system includes a backup server configured to receive a backup instruction, where the backup instruction carries an identifier of the application and is used to instruct that data of the application be backed up, query a cloud operation server according to the identifier of the application, so as to determine a plurality of virtual machines where the application runs, and send a snapshot creation request for virtual machines to the cloud operation server, where the snapshot creation request for the virtual machines carries identifiers of the plurality of virtual machines and instruction information, where the instruction information is used to instruct that consistent snapshot operations be performed on data of the plurality of virtual machines; the cloud operation server configured to determine, according to the identifier of the application carried in query information of the backup server, the identifiers of the plurality of virtual machines where the application runs, receive the snapshot creation request for the virtual machines which is sent by the backup server, determine a deployment server of the plurality of virtual machines, and send a snapshot instruction to the deployment server of the plurality of virtual machines according to the instruction information carried in the snapshot creation request for the virtual machines, where the snapshot instruction is used to instruct the deployment server to perform the consistent snapshot operations on data of the plurality of virtual machines, so as to generate snapshot files of the plurality of virtual machines; and the deployment server configured to receive the snapshot instruction sent by the cloud operation server, suspend a write operation on each virtual machine at a consistent time point according to the snapshot instruction, and take a snapshot on a storage volume of each virtual machine, so as to generate a snapshot file of each virtual machine.

According to a fifteenth aspect, an embodiment of the present invention provides a snapshot generating system, where the system includes a backup server configured to receive a backup instruction, where the backup instruction carries an identifier of the application and is used to instruct that data of the application be backed up, query a cloud operation server according to the identifier of the application, so as to determine a plurality of virtual machines where the application runs and a deployment server of the plurality of virtual machines, and send a snapshot instruction to the deployment server of the plurality of virtual machines, where the snapshot instruction is used to instruct the deployment server of the plurality of virtual machines to perform consistent snapshot operations on data of the plurality of virtual machines, so as to generate snapshot files of the plurality of virtual machines; the cloud operation server configured to determine, according to the identifier of the application carried in query information of the backup server, the plurality of virtual machines where the application runs and determine the deployment server of the plurality of virtual machines; and the deployment server configured to receive the snapshot instruction sent by the backup server, suspend a write operation on each virtual machine at a consistent time point according to the snapshot instruction, and take a snapshot on a storage volume of each virtual machine, so as to generate a snapshot file of each virtual machine.

In an embodiment of the present invention, a snapshot operation can be performed with a granularity of an application, where, after a snapshot creation request for an application is received, a plurality of virtual machines where the application runs and a deployment server where the plurality of virtual machines is deployed are determined automatically, and a snapshot instruction is sent to the deployment server of the plurality of virtual machines, so that the deployment server of the plurality of virtual machines can generate snapshot files of the plurality of virtual machines at a same time point or approximately the same time points according to the snapshot instruction, thereby implementing unified consistent snapshot operations on data of the application and ensuring consistency among snapshot data of the application.

In another embodiment of the present invention, a snapshot creation request for virtual machines may be received, where the snapshot request for the virtual machines carries instruction information, where the instruction information is used to instruct that consistent snapshot operations be performed on data of a plurality of virtual machines, and a snapshot instruction is sent to a deployment server of the plurality of virtual machines according to the instruction information, so that the deployment server of the plurality of virtual machines can generate snapshot files of the plurality of virtual machines at a same time point or approximately the same time points according to the snapshot instruction, thereby implementing unified consistent snapshot operations on data of an application and ensuring consistency among snapshot data of the application.

In another embodiment of the present invention, after an application backup instruction is received, a plurality of virtual machines where an application runs and a deployment server where the plurality of virtual machines is deployed are determined automatically, and a snapshot instruction is sent to the deployment server of the plurality of virtual machines, so that the deployment server of the plurality of virtual machines can generate snapshot files of the plurality of virtual machines at a same time point or approximately the same time points according to the snapshot instruction, thereby implementing unified consistent snapshot operations on data of the application and ensuring consistency among snapshot data of the application.

BRIEF DESCRIPTION OF DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

Embodiments of the present invention provide a snapshot generating method, system, and apparatus, which can perform consistent snapshot operations on virtual machines where an application runs, so as to perform unified snapshot operations on the virtual machines where the application runs and implement consistency among backup data.

Because a time when a host (a deployment server where a virtual machine is located) that performs a snapshot operation starts a snapshot operation may be decided according to tasks executed by the host, if the host (the deployment server where the virtual machine is located) that performs the snapshot operation decides to start a snapshot operation on data of the virtual machine according to a running state and a task load of the host, and a priority of the snapshot operation may be lower than that of another task, so that the snapshot operation is not executed immediately. Because hosts where virtual machines are located execute different tasks with different task loads, it is possible that deployment servers where different virtual machines are located start snapshot operations on data of the virtual machines at different time points, and as a result, backup data of the virtual machines is inconsistent. Consistency among snapshot operations mentioned in the embodiments of the present invention mainly refers to time consistency among the snapshot operations, that is, the snapshot operations are initiated at a same or approximately the same time, so as to avoid initiation of snapshot operations at time points with a long interval. It should be noted that consistent time points mentioned in the embodiments of the present invention mean a same time point or approximately the same time points, and include a same time point, which does not only refer to absolutely the same time point, and that the scope of approximately the same time is a time error range of data consistency commonly accepted by a person skilled in the art. A time error between two time points which is recommended by the embodiments of the present invention is within 30 seconds.

Figure 1A:
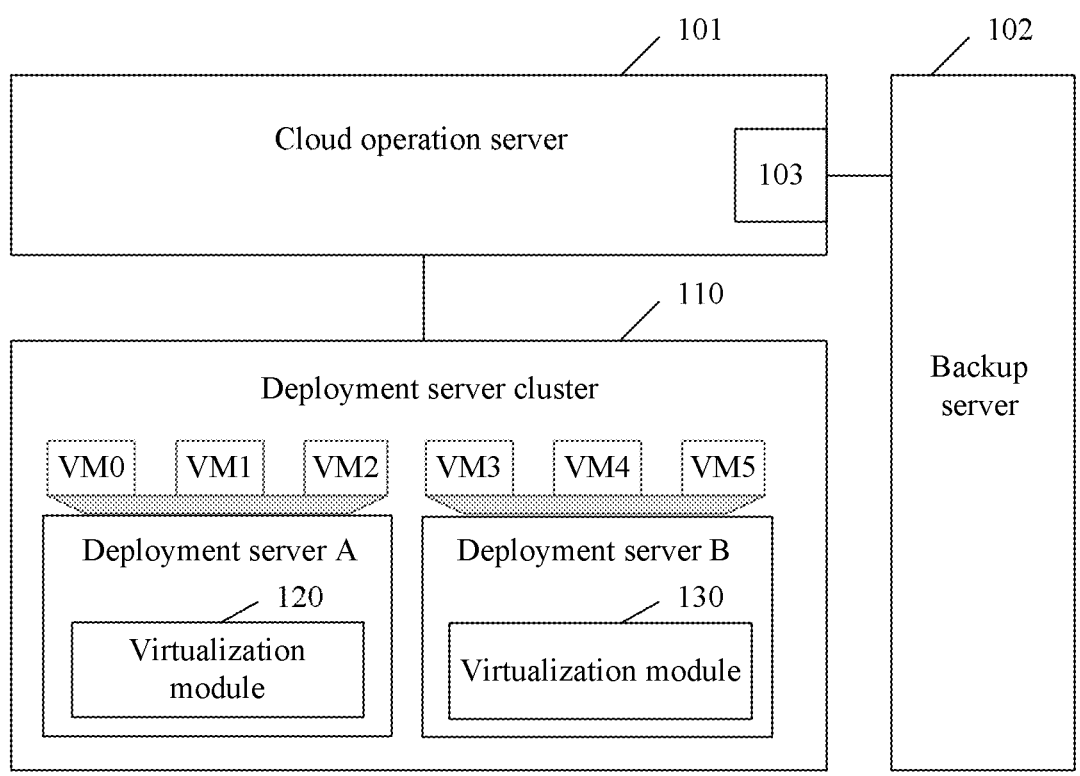
FIG. 1A and FIG. 1B are system block diagrams provided by embodiments of the prevent invention.

As shown in FIG. 1A, which shows an example of a system implementing an embodiment of the present invention, the system includes a cloud operation server 101 and a deployment server cluster 110 (which may also be called a physical machine cluster for cloud computing). The deployment server cluster 110 is configured to provide computing, storage, network and other resources for the system. The cloud operation server 101 may manage and allocate resources of the system. The deployment server cluster 110 may include one or more deployment servers, and two deployment servers, that is, a deployment server A and a deployment server B, are shown in FIG. 1A, which is not limited by the embodiment of the present invention.

A deployment server in the deployment server cluster 110 is also provided with a virtualization module, for example, a virtualization module 120 of the deployment server A and a virtualization module 130 of the deployment server B. The virtualization module is configured to abstract computing (including processors and memories), storage and network resources on a deployment server to a plurality of virtual machines, where each virtual machine has a processor, a memory, a storage volume, and a network connection and is capable of running its operating system and application programs. For example, the virtualization module 120 abstracts resources of the deployment server A to virtual machines (VM) VM0, VM1 and VM2, and the virtualization module 130 abstracts resources of the deployment server B to virtual machines VM3, VM4 and VM5, where the VM0 to the VM5 have their respective input/output systems and storage volumes and are capable of running their respective application programs.

The cloud operation server 101 may include a cloud management module and a cloud platform and is capable of deploying and managing an application in the system, for example, deploying the application and allocating a virtual machine and computing, storage and other resources of the virtual machine to the application. The cloud management module is configured to manage the application and store deployment description information of the application, for example, virtual machines where the application runs and on which deployment server the virtual machines are deployed. The cloud platform is configured to manage virtual machines, and manage virtual machines on the deployment server cluster. The cloud management module and the cloud platform may be integrated into a same server or may be deployed separately. The embodiment of the present invention uses integrated deployment as an example.

The cloud operation server 101 may use the virtualization modules 120 and 130 to deploy the application onto one or more virtual machines, that is, to create the application in the system. For example, the cloud operation server 101 may deploy an application (APP) 1 onto the VM1, the VM2 and the VM3, where data of the APP1 is stored in storage volumes of the VM1, the VM2 and the VM3. After deploying the application, the cloud operation server may further collect configuration information of the application, for example, information about virtual machines where the application runs and information about a deployment server of the virtual machines.

The virtualization modules 120 and 130 may further perform snapshot operations on the virtual machines according to an instruction of the cloud operation server 101, so as to generate snapshot files of the virtual machines. For example, the virtualization module 120 may take a snapshot on a storage volume of the VM1 to generate a snapshot file of the VM1, where the snapshot file of the VM1 may be stored in the storage volume of the VM1. The snapshot file is in nature a specific file in a read-only state, and is capable of recording all data and information of the virtual machine at a snapshot moment. Therefore, the data of the virtual machine can be backed up according to the snapshot file of the virtual machine.

In the embodiment of the present invention, in order to implement backup of application data, a backup server 102 is added to the system. The backup server 102 is in communication connection with the cloud operation server, as shown in FIG. 1A. Then, three manners may be used to implement unified snapshot operations on virtual machines where the application runs, so as to implement unified backup of the application data.

In a first manner, in the system shown in FIG. 1A, the backup server 102 sends a snapshot creation request for an application to the cloud operation server 101 according to a requirement for backup of data of an application, where the snapshot creation request for the application carries an identifier of the application, so that the cloud operation server 101 determines, according to the snapshot creation request for the application, a plurality of virtual machines where the application runs and a deployment server where the plurality of virtual machines is deployed, and instructs the deployment server where the plurality of virtual machines is deployed to perform consistent snapshot operations on the plurality of virtual machines.

In a second manner, a cloud management interface 103 is added to the cloud operation server 101 shown in FIG. 1A, so that the cloud operation server 101 supports a query of the backup server 102 for configuration information of a currently running application, and therefore, the backup server 102 can determine, according to a requirement for backup of data of the application by querying the cloud operation server, a plurality of virtual machines where the application runs, and send a snapshot creation request for virtual machines to the cloud operation server 101, where the snapshot creation request for the virtual machines carries identifiers of the plurality of virtual machines, so that the cloud operation server 101 instructs, according to the snapshot creation request for the virtual machines, a physical host where the plurality of virtual machines is deployed to perform consistent snapshot operations on the plurality of virtual machines.

Figure 1B:
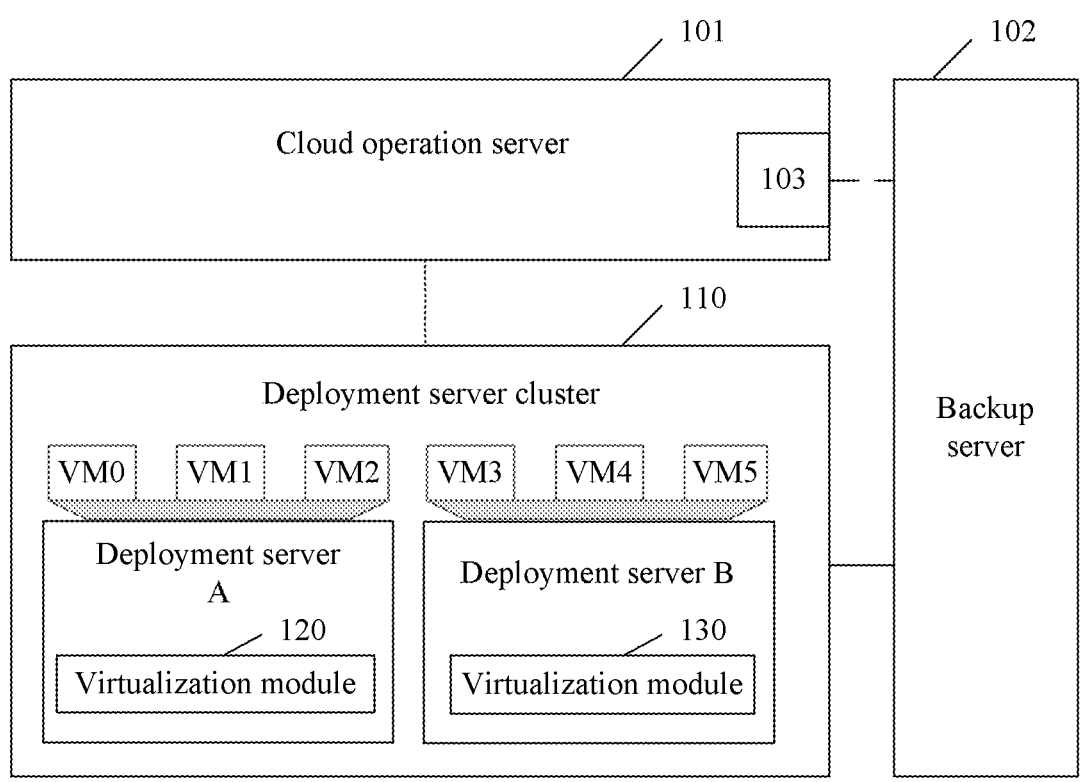

In a third manner, in the system shown in FIG. 1A, the backup server instructs, using the cloud operation server, the deployment server to perform snapshot operations. The backup server may also be in communication connection with the deployment server cluster 110, as shown in FIG. 1B, and then, the backup server 102 may determine, according to a requirement for backup of data of an application by querying the cloud operation server, a plurality of virtual machines where the application runs and a deployment server of the plurality of virtual machines, and instruct the deployment server of the plurality of virtual machines to start snapshot operations on the plurality of virtual machines at consistent time points, so as to generate snapshot files of the plurality of virtual machines at the consistent time points.

Specific implementation manners will be described in detail in the following embodiments.

Snapshot Generating Method

Figure 2:
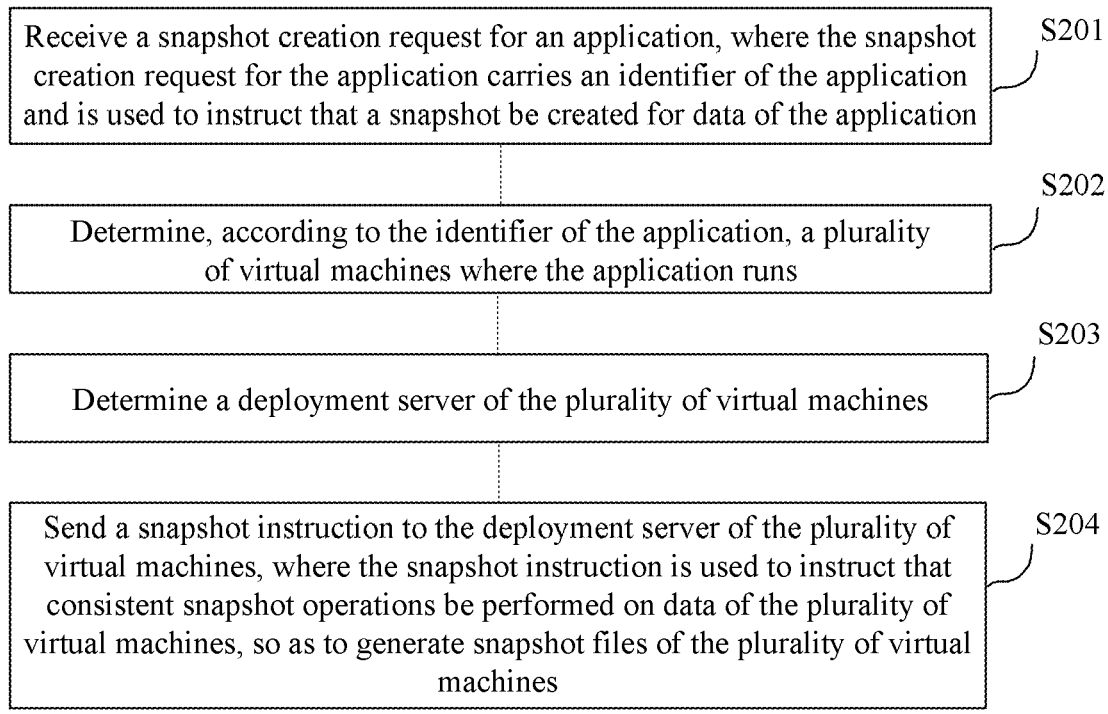
FIG. 2 is a flowchart of a snapshot generating method provided by an embodiment of the present invention.

With reference to the system architecture shown in FIG. 1A, an embodiment of the present invention provides a snapshot generating method, and as shown in FIG. 2, the method may include the following steps:

S201: Receive a snapshot creation request for an application, where the snapshot creation request for the application carries an identifier of the application and is used to instruct that a snapshot be created for data of the application.

For example, the backup server may send a request for creating a snapshot for an application APP1 to the cloud operation server and the cloud operation server may receive the request for creating a snapshot for the application APP1 and start creation of the snapshot for the data of the APP1.

When the APP1 runs on a plurality of virtual machines, in order to ensure consistency among backup data of the APP1 which is generated according to snapshot files of the plurality of virtual machines where the APP1 runs, consistent snapshot operations need to be performed on the plurality of virtual machines where the APP1 runs, so that the snapshot files of the plurality of virtual machines of the APP1 are at consistent time points, thereby ensuring consistency among backup data of the plurality of virtual machines. In this case, a snapshot policy of the application may be preset for the cloud operation server or the request may carry instruction information to instruct the cloud operation server to perform consistent snapshot operations on the data of the application.

S202: Determine, according to the identifier of the application, a plurality of virtual machines where the application runs.

After the cloud operation server deploys the application in the system, the cloud operation server may collect configuration information of the application, for example, information about virtual machines where the application runs and information about a deployment server where the virtual machines are deployed. Therefore, the cloud operation server can determine, according to the identifier of the application, the plurality of virtual machines where the application runs.

S203: Determine a deployment server of the plurality of virtual machines.

The cloud operation server may determine the deployment server of the plurality of virtual machines, so as to subsequently instruct the deployment server of the plurality of virtual machines to perform snapshot operations on the plurality of virtual machines.

S204: Send a snapshot instruction to the deployment server of the plurality of virtual machines, where the snapshot instruction is used to instruct that consistent snapshot operations be performed on data of the plurality of virtual machines, so as to generate snapshot files of the plurality of virtual machines.

In order to perform unified snapshot operations on the virtual machines where the application runs, the cloud operation server may use the snapshot instruction to carry some instruction information to instruct the deployment server of the plurality of virtual machines to start the snapshot operations on the plurality of virtual machines at consistent time points.

In the embodiment of the present invention, the cloud operation server may determine, according to the snapshot creation request for the application, the plurality of virtual machines where the application runs and the deployment server where the plurality of virtual machines is deployed, and send the snapshot instruction to the deployment server of the plurality of virtual machines, so that the deployment server of the plurality of virtual machines can start the snapshot operations on the plurality of virtual machines at the consistent time points according to the snapshot instruction, so as to generate the snapshot files of the plurality of virtual machines at the consistent time points, thereby implementing unified snapshots on the virtual machines where the application runs and ensuring consistency among snapshot data of the application. Different from the prior art where snapshot operations and data backup are performed with a granularity of a virtual machine, the embodiment of the present invention implements unified snapshots and backup on the virtual machines where the application runs, and avoids situations of inconsistent snapshot data and inconsistent backup data of virtual machines where a same application runs, which are possibly caused by a snapshot manner with the granularity of a virtual machine.

Figure 3:
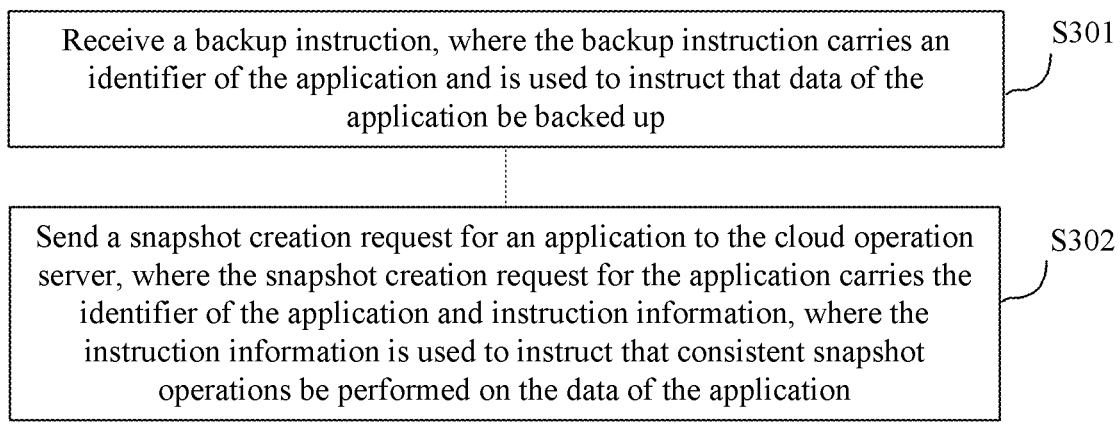
FIG. 3 is a flowchart of another snapshot generating method provided by an embodiment of the present invention.

With reference to the system architecture shown in FIG. 1A, an embodiment of the present invention provides a snapshot generating method, and as shown in FIG. 3, the method may include the following steps:

S301: Receive a backup instruction, where the backup instruction carries an identifier of the application and is used to instruct that data of the application be backed up.

For example, the backup instruction may be triggered by a user, so that the backup server backs up the data of the application according to the backup instruction. For another example, the backup instruction may be generated in a timed manner using a backup policy of the application preset in the backup server, so as to start backup of the data of the application.

S302: Send a snapshot creation request for an application to the cloud operation server, where the snapshot creation request for the application carries the identifier of the application and instruction information, where the instruction information is used to instruct that consistent snapshot operations be performed on the data of the application.

After receiving the backup instruction, the backup server starts backup of the data of the application. For example, the backup server sends the snapshot creation request for the application to the cloud operation server, where the snapshot creation request for the application carries the instruction information, so that the cloud operation server performs the consistent snapshot operations on the data of the application according to the instruction information.

In the embodiment of the present invention, the backup server may send the snapshot creation request for the application to the cloud operation server according to the received backup instruction, so that the cloud operation server can perform the consistent snapshot operations on the data of the application according to the instruction information carried in the snapshot creation request for the application, thereby implementing unified snapshots on the data of the application. Different from the prior art where snapshot operations and data backup are performed with a granularity of a virtual machine, the embodiment of the present invention implements unified snapshots and backup on virtual machines where the application runs, and avoids situations of inconsistent snapshot data and inconsistent backup data of virtual machines where a same application runs, which are possibly caused by a snapshot manner with the granularity of a virtual machine.

Figure 4:
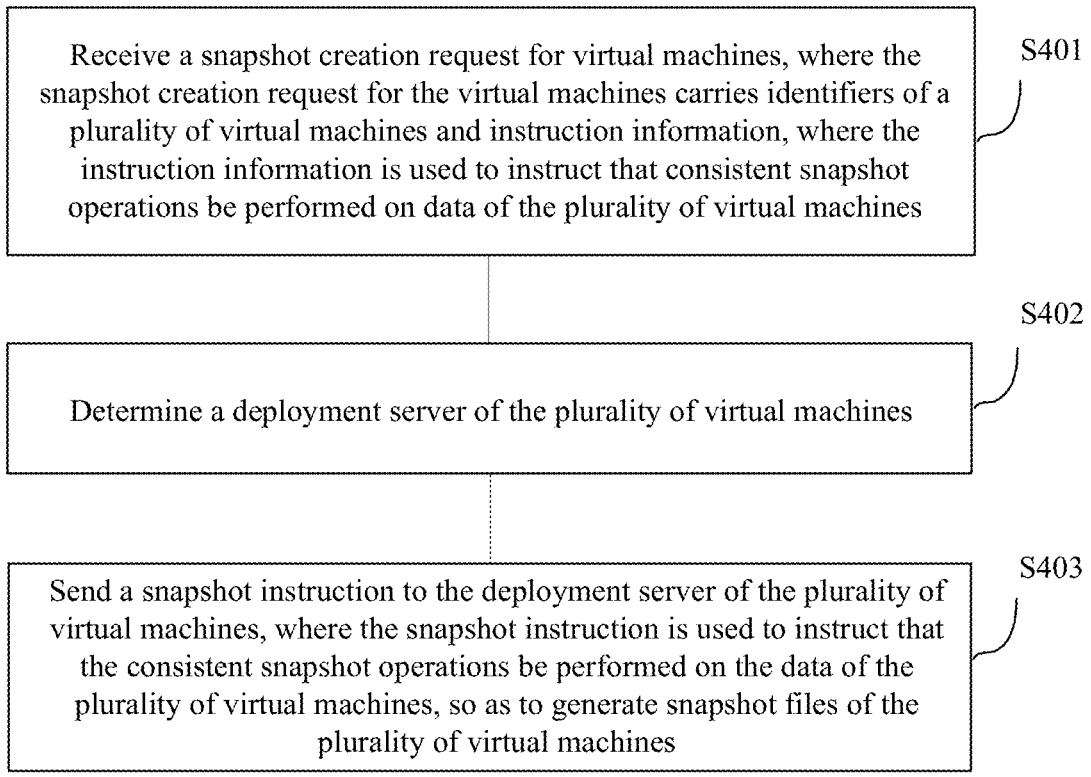
FIG. 4 is a flowchart of another snapshot generating method provided by an embodiment of the present invention.

With reference to the system architecture shown in FIG. 1A, an embodiment of the present invention provides a snapshot generating method, and as shown in FIG. 4, the method may include the following steps:

S401: Receive a snapshot creation request for virtual machines, where the snapshot creation request for the virtual machines carries identifiers of a plurality of virtual machines and instruction information, where the instruction information is used to instruct that consistent snapshot operations be performed on data of the plurality of virtual machines.

The backup server may send the snapshot creation request for the virtual machines to the cloud operation server, where the request carries the identifiers of the plurality of virtual machines and the instruction information, and the cloud operation server may receive the snapshot creation request for the virtual machines and start creation of snapshots for the plurality of virtual machines at consistent time points.

The identifiers of the plurality of virtual machines may be identifiers of all virtual machines where an application runs, so that the backup server may instruct, using the snapshot creation request for the virtual machines, the cloud operation server to start creation of snapshots for all virtual machines where an application runs.

S402: Determine a deployment server of the plurality of virtual machines.

The cloud operation server may determine the deployment server of the plurality of virtual machines according to the identifiers of the plurality of virtual machines, so as to subsequently instruct the deployment server of the plurality of virtual machines to perform the snapshot operations on the plurality of virtual machines.

S403: Send a snapshot instruction to the deployment server of the plurality of virtual machines, where the snapshot instruction is used to instruct that the consistent snapshot operations be performed on the data of the plurality of virtual machines, so as to generate snapshot files of the plurality of virtual machines.

The snapshot creation request for the virtual machines received by the cloud operation server may carry the instruction information used to instruct the cloud operation server to perform the consistent snapshot operations on the data of the plurality of virtual machines. Therefore, in order to perform unified snapshot operations on the plurality of virtual machines, the cloud operation server may instruct, according to the instruction information using the snapshot instruction, the deployment server of the plurality of virtual machines to start the snapshot operations on the plurality of virtual machines at the same time.

In the embodiment of the present invention, the cloud operation server may determine, according to the snapshot creation request for the virtual machines, the deployment server where the plurality of virtual machines is deployed, and send the snapshot instruction to the deployment server of the plurality of virtual machines, so that the deployment server of the plurality of virtual machines can start the snapshot operations on the plurality of virtual machines at the same time according to the snapshot instruction, so as to generate the snapshot files of the plurality of virtual machines at the consistent time points. When the plurality of virtual machines is all virtual machines where an application runs, the method can implement unified snapshots on all the virtual machines where the application runs and ensure consistency among snapshot data of the application. Different from the prior art where snapshot operations and data backup are performed with a granularity of a virtual machine, the embodiment of the present invention implements unified snapshots and backup on the virtual machines where the application runs, and avoids situations of inconsistent snapshot data and inconsistent backup data of virtual machines where a same application runs, which are possibly caused by a snapshot manner with the granularity of a virtual machine.

Figure 5:
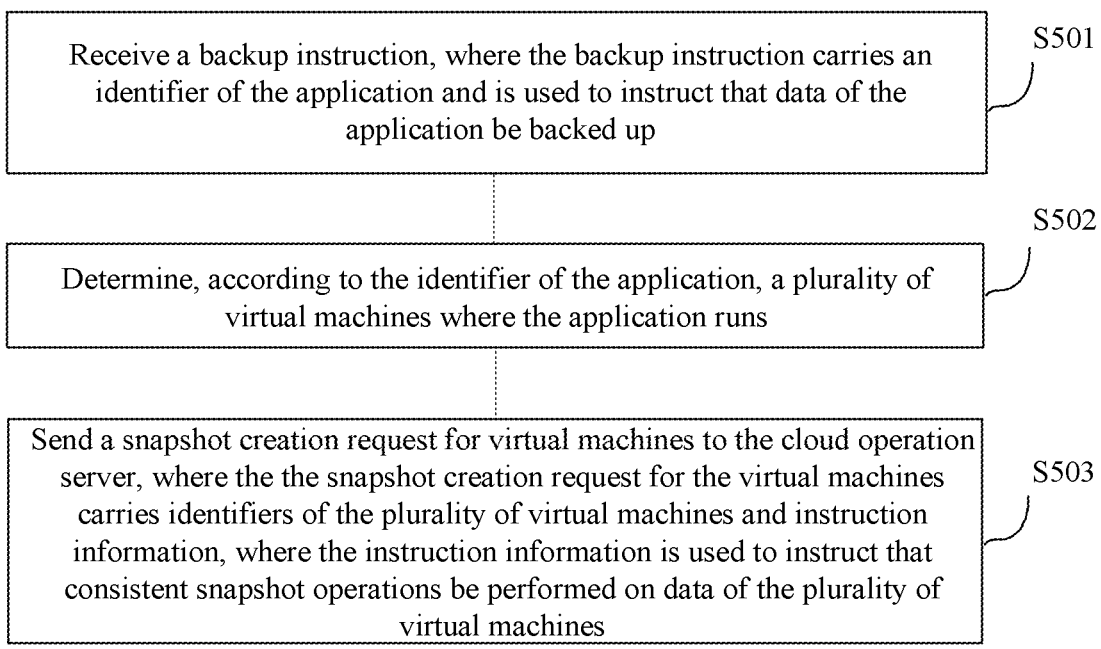
FIG. 5 is a flowchart of another snapshot generating method provided by an embodiment of the present invention.

With reference to the system architecture shown in FIG. 1A, an embodiment of the present invention provides a snapshot generating method, and as shown in FIG. 5, the method may include the following steps:

S501: Receive a backup instruction, where the backup instruction carries an identifier of the application and is used to instruct that data of the application be backed up.

For example, the backup instruction may be triggered by a user, so that the backup server backs up the data of the application according to the backup instruction. For another example, the backup instruction may be generated in a timed manner using a backup policy of the application preset in the backup server, so as to start backup of the data of the application.

S502: Determine, according to the identifier of the application, a plurality of virtual machines where the application runs.

The backup server may query the cloud operation server using a cloud management interface to determine the plurality of virtual machines where the application runs, so as to subsequently instruct that snapshot operations be performed on the plurality of virtual machines.

S503: Send a snapshot creation request for virtual machines to the cloud operation server, where the snapshot creation request for the virtual machines carries identifiers of the plurality of virtual machines and instruction information, where the instruction information is used to instruct that consistent snapshot operations be performed on data of the plurality of virtual machines.

After receiving the backup instruction, the backup server starts backup of the data of the application. For example, the backup server may send the snapshot creation request for the virtual machines to the cloud operation server, where the request carries the identifiers of the plurality of virtual machines where the application runs, so that the cloud operation server can perform, according to the snapshot creation request for the virtual machines, the snapshot operations on the plurality of virtual machines where the application runs. In addition, in order to implement unified snapshot operations on the data of the plurality of virtual machines where the application runs, the snapshot creation request for the virtual machines may further carry the instruction information used to instruct the cloud operation server to perform the consistent snapshot operations on the data of the plurality of virtual machines where the application runs.

In the embodiment of the present invention, the backup server may, after receiving the backup instruction, determine the plurality of virtual machines where the application runs and send the snapshot creation request for the virtual machines, so that the cloud operation server can perform, according to the snapshot creation request for the virtual machines, the consistent snapshot operations on the data of the plurality of virtual machines where the application runs, thereby implementing unified snapshots on the data of the plurality of virtual machines and ensuring consistency among backup data of the application. Different from the prior art where snapshot operations and data backup are performed with a granularity of a virtual machine, the embodiment of the present invention implements unified snapshots and backup on the virtual machines where the application runs, and avoids situations of inconsistent snapshot data and inconsistent backup data of virtual machines where a same application runs, which are possibly caused by a snapshot manner with the granularity of a virtual machine.

Figure 6:
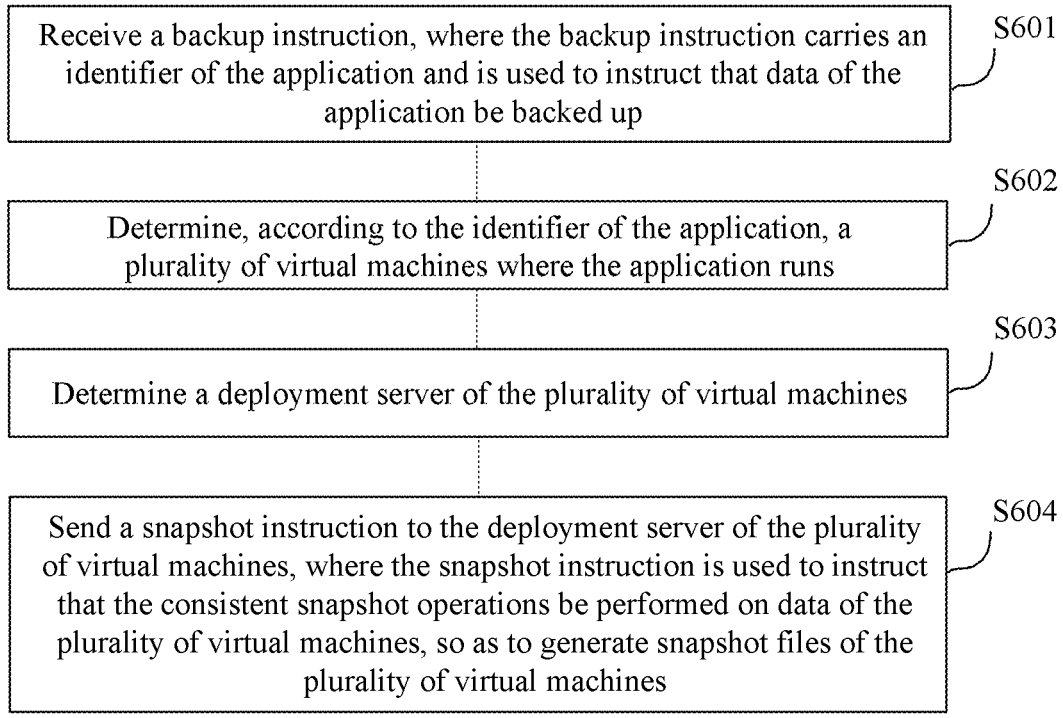
FIG. 6 is a flowchart of another snapshot generating method provided by an embodiment of the present invention.

With reference to the system architecture shown in FIG. 1B, an embodiment of the present invention provides a snapshot generating method, and as shown in FIG. 6, the method may include the following steps:

S601: Receive a backup instruction, where the backup instruction carries an identifier of the application and is used to instruct that data of the application be backed up.

The backup instruction may be triggered by a user, or may be generated in a timed manner using a backup policy of the application preset in the backup server, and the backup server starts backup of the data of the application after receiving the backup instruction.

Further, when the backup instruction is triggered by a user, the backup instruction may further carry instruction information, where the instruction information is used to instruct that consistent snapshot operations be performed on the data of the application, so that the backup server can subsequently perform the consistent snapshot operations on the data of the application.

When the backup instruction is generated in the timed manner using the backup policy of the application, a snapshot policy of the application may further be preset in the backup server, where the snapshot policy of the application instructs that the consistent snapshot operations be performed on the data of the application, so that the backup server can subsequently perform the consistent snapshot operations on the data of the application.

S602: Determine, according to the identifier of the application, a plurality of virtual machines where the application runs.

The backup server may query the cloud operation server using a cloud management interface to determine the plurality of virtual machines where the application runs.

S603: Determine a deployment server of the plurality of virtual machines.

The backup server may determine the deployment server of the plurality of virtual machines by querying the cloud operation server, so as to subsequently instruct the deployment server of the plurality of virtual machines to perform the snapshot operations on the plurality of virtual machines.

S604: Send a snapshot instruction to the deployment server of the plurality of virtual machines, where the snapshot instruction is used to instruct that the consistent snapshot operations be performed on data of the plurality of virtual machines, so as to generate snapshot files of the plurality of virtual machines.

In order to perform unified snapshot operations on the virtual machines where the application runs, the backup server may instruct, according to the instruction information or the snapshot policy of the application, the deployment server of the plurality of virtual machines to start the snapshot operations on the plurality of virtual machines at consistent time points.

In the embodiment of the present invention, the backup server may start backup of the data of the application according to the backup instruction, determine the plurality of virtual machines where the application runs and the deployment server where the plurality of virtual machines is deployed, and send the snapshot instruction to the deployment server of the plurality of virtual machines, so that the deployment server of the plurality of virtual machines can start, the snapshot operations on the plurality of virtual machines at the consistent time points according to the snapshot instruction, so as to generate the snapshot files of the plurality of virtual machines, thereby implementing unified snapshots on the plurality of virtual machines where the application runs and ensuring consistency among snapshot data of the application. Different from the prior art where snapshot operations and data backup are performed with a granularity of a virtual machine, the embodiment of the present invention implements unified snapshots and backup on the virtual machines where the application runs, and avoids situations of inconsistent snapshot data and inconsistent backup data of virtual machines where a same application runs, which are possibly caused by a snapshot manner with the granularity of a virtual machine.

Figure 7:
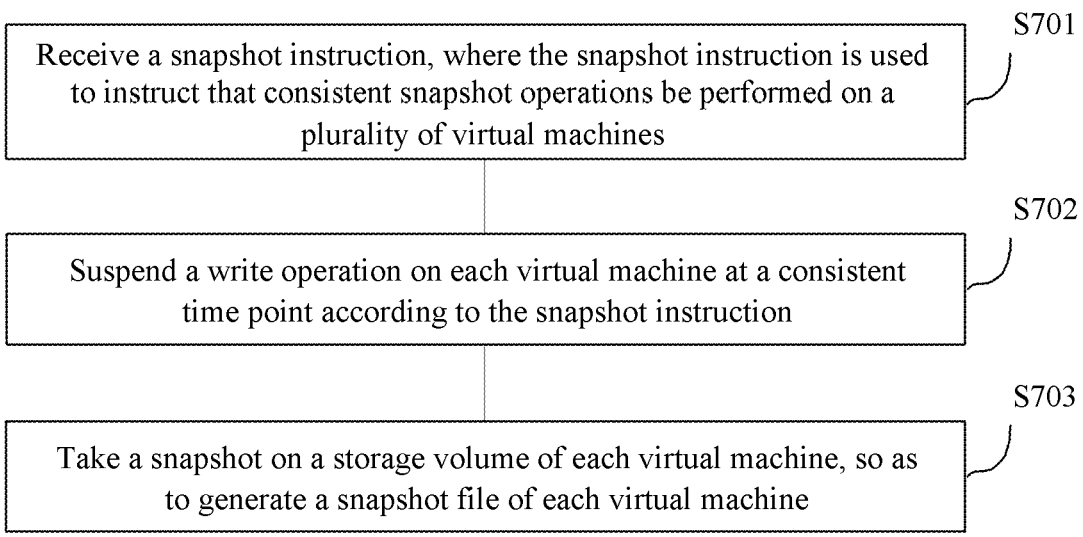
FIG. 7 is a flowchart of another snapshot generating method provided by an embodiment of the present invention.

With reference to the system architecture shown in FIG. 1A or FIG. 1B, an embodiment of the present invention provides a snapshot generating method, and as shown in FIG. 7, the method may include the following steps:

S701: Receive a snapshot instruction, where the snapshot instruction is used to instruct that consistent snapshot operations be performed on a plurality of virtual machines.

The backup server or the cloud operation server may send the snapshot instruction to a deployment server, where the snapshot instruction carries identifiers of the plurality of virtual machines. The deployment server may perform the consistent snapshot operations on the plurality of virtual machines according to the snapshot instruction. For example, the backup server may send the snapshot instruction to the deployment server A where the VM1 and the VM2 are deployed, and the snapshot instruction carries identifiers of the VM1 and the VM2. Then, the deployment server A performs consistent snapshot operations on the VM1 and the VM2 according to the snapshot instruction.

S702: Suspend a write operation on each virtual machine at a consistent time point according to the snapshot instruction.

For example, a virtualization module of the deployment server may suspend write operations on the VM1 and the VM2 at the consistent time points, that is, enable the VM1 and the VM2 to stop working at the same time. At this time, information about the VM1 and the VM2 stored in storage volumes of the VM1 and the VM2 is at consistent time points, so that consistent snapshot data of the VM1 and the VM2 is generated subsequently.

S703: Take a snapshot on a storage volume of each virtual machine, so as to generate a snapshot file of each virtual machine.

The virtualization module of the deployment server may perform the snapshot operations on the storage volumes of the VM1 and the VM2 separately to generate snapshot files of the VM1 and the VM2. Because the information about the VM1 and the VM2 stored in the storage volumes of the VM1 and the VM2 is at consistent time points, the consistent snapshot operations on the VM1 and the VM2 are implemented.

In the embodiment of the present invention, the deployment server may receive the snapshot instruction, where the snapshot instruction carries the identifiers of the plurality of virtual machines, and after suspending write operations on the plurality of virtual machines at the consistent time points according to the snapshot instruction, perform the consistent snapshot operations on the plurality of virtual machines, thereby implementing unified snapshot operations on the plurality of virtual machines and ensuring consistency among snapshot data of the plurality of virtual machines.

Specific Embodiment 1

Figure 8:
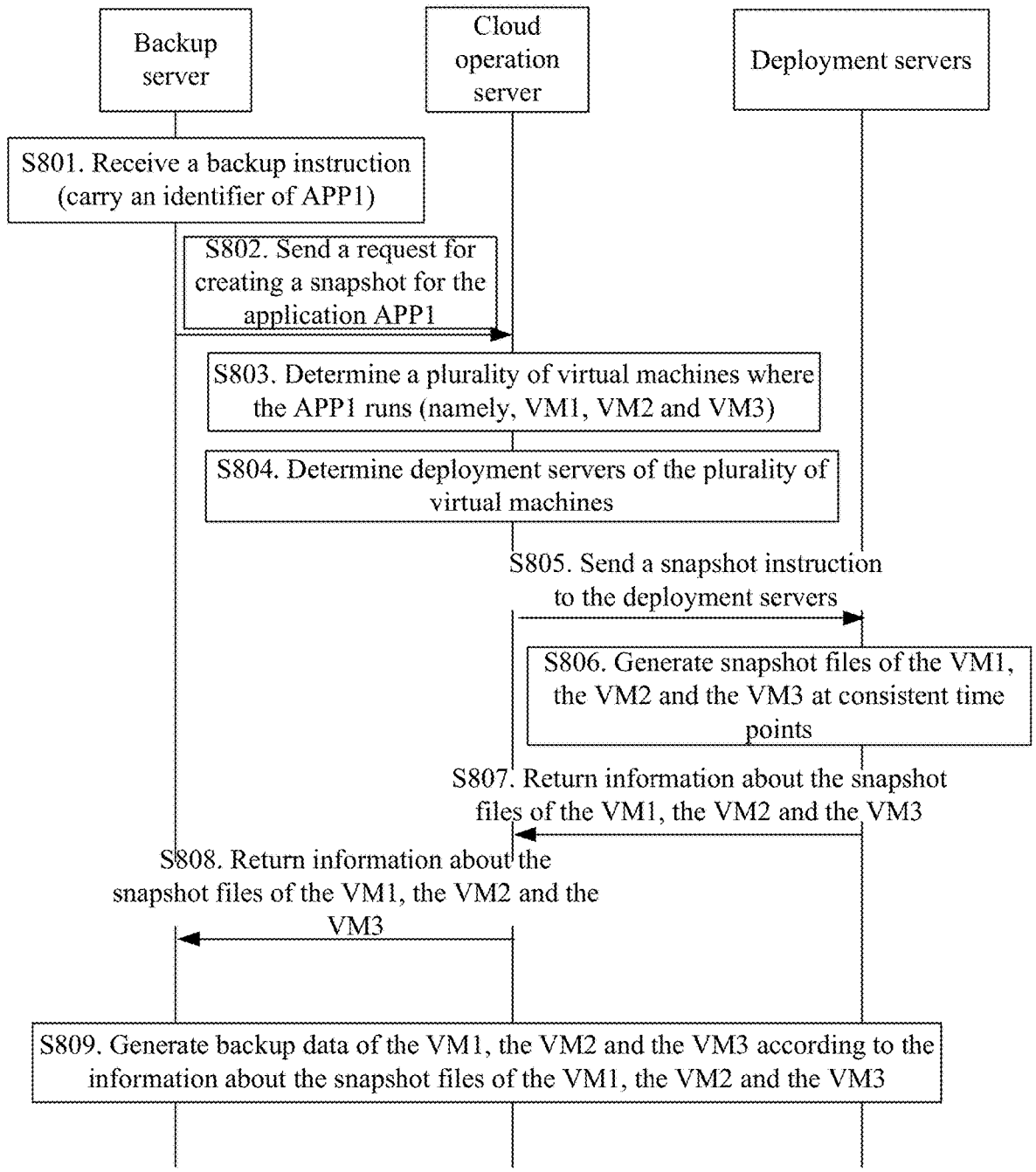
FIG. 8 is a flowchart of another snapshot generating method provided by an embodiment of the present invention.

With reference to the system architecture shown in FIG. 1A, an embodiment of the present invention provides a snapshot generating method. As shown in FIG. 8, the method is used to perform a snapshot operation on data of an application. For example, data of APP1 is to be backed up, where the APP1 runs on the VM1, the VM2, and the VM3, where the VM1 and the VM2 are deployed on the deployment server A, and the VM3 is deployed on the deployment server B. The method may include the following steps:

S801: The backup server receives a backup instruction, where the backup instruction carries an identifier of the APP1.

The backup instruction carries an identifier of an application, for example, the identifier of the APP1. After receiving the backup instruction, the backup server starts backup of the data of the APP1. The identifier of the application may be a name or an ID of the application, which is not limited by the embodiment of the present invention.

The backup instruction may be triggered by a user according to a requirement. For example, when the data of the APP1 needs to be backed up, the user sends the backup instruction to the backup server, where the backup instruction carries the identifier of the APP1 and instruction information, where the instruction information is used to instruct that consistent snapshot operations be performed on the data of the application. The backup server may receive the backup instruction triggered by the user, and back up the data of the APP1.

The backup instruction may further be generated in a timed manner by the backup server according to a preset backup policy of the application. For example, the user may preset the backup policy of the APP1 in the backup server as follows, the data of the APP1 is backed up once every 10 hours, and then, the backup server generates the backup instruction once every 10 hours, where the backup instruction carries the identifier of the APP1. Then, the backup server may start backup of the data of the APP1 according to the backup instruction which is generated in the timed manner.

S802: The backup server sends a request for creating a snapshot for the application APP1 to the cloud operation server.

After receiving the backup instruction, the backup server sends the request for creating a snapshot for the application APP1 to the cloud operation server, where the request for creating a snapshot for the application APP1 carries the identifier of the APP1, so as to instruct the cloud operation server to create the snapshot for the data of the APP1.

The request for creating a snapshot for the application APP1 carries instruction information in addition to the identifier of the APP1, where the instruction information is used to instruct the cloud operation server to perform the consistent snapshot operations on the data of the APP1, so as to implement unified backup on a plurality of virtual machines where the APP1 runs and ensure consistency among backup data.

S803: The cloud operation server determines, according to the identifier of the APP1, the plurality of virtual machines where the APP1 runs.

The cloud operation server receives the snapshot creation request for the application, and determines the plurality of virtual machines where the APP1 runs, so as to subsequently perform the snapshot operations on the plurality of virtual machines where the APP1 runs.

The cloud operation server may collect configuration information of the APP1 after the APP1 is deployed in the system. For example, the configuration information of the APP1 may include the following steps:

1) The virtual machines where the APP1 runs are the VM1, the VM2 and the VM3.

2) The VM1 and the VM2 are deployed on the deployment server A.

3) The VM3 is deployed on the deployment server B.

Then, the cloud operation server queries the configuration information of the application in the system according to the identifier of the APP1, and can determine that the plurality of virtual machines where the APP1 runs is the VM1, the VM2 and the VM3.

S804: The cloud operation server determines deployment servers of the plurality of virtual machines.

The cloud operation server may further determine the deployment servers of the VM1, the VM2 and the VM3, so as to subsequently instruct the deployment servers of the VM1, the VM2 and the VM3 to perform the snapshot operations on the VM1, the VM2 and the VM3 at a same moment.

The cloud operation server may, by querying the configuration information of the APP1, determine that a deployment server where the VM1 and the VM2 are deployed is the deployment server A and determine that a deployment server where the VM3 is deployed is the deployment server B.

S805: The cloud operation server sends a snapshot instruction to the deployment server A and the deployment server B according to the instruction information.

The cloud operation server may send the snapshot instruction to the deployment servers of the plurality of virtual machines, that is, send the snapshot instruction separately to the deployment server A and the deployment server B. The snapshot instruction is used to instruct that the consistent snapshot operations be performed on data of the VM1, the VM2 and the VM3, so as to generate snapshot files of the VM1, the VM2 and the VM3.

The cloud operation server may determine, according to the instruction information, that the consistent snapshot operations need to be performed on the data of the VM1, the VM2 and the VM3. The cloud operation server may perform the snapshot operations at a same moment on the data of the VM1, the VM2 and the VM3 in the following two manners:

1) Manner 1

The cloud operation server sends the snapshot instruction separately to the deployment server A and the deployment server B at a same time point, where the snapshot instruction sent to the deployment server A carries identifiers of the VM1 and the VM2 and first information, and the snapshot instruction sent to the deployment server B carries an identifier of the VM3 and the first information, where the first information is used to instruct that the snapshot operation be performed immediately after the snapshot instruction is received, that is, used to indicate that the snapshot operation has a high processing priority. In this way, the deployment server A and the deployment server B can receive the snapshot instruction at consistent time points, and start the snapshot operation at the consistent time points according to the first information.

2) Manner 2

The cloud operation server may send the snapshot instruction separately to the deployment server A and the deployment server B, where the snapshot instruction sent to the deployment server A carries identifiers of the VM1 and the VM2 and second information, and the snapshot instruction sent to the deployment server B carries an identifier of the VM3 and the second information, where the second information is used to instruct that the snapshot operation be started at a same time. For example, the second information may instruct that the snapshot operation be started at 4:00 pm on a current day. Then, the deployment server A and the deployment server B start the snapshot operation at the same time according to the second information.

Using the above two manners, it is ensured that the deployment server A and the deployment server B start the snapshot operations at the consistent time points. However, because two virtual machines, that is, the VM1 and the VM2, are deployed on the deployment server A, the deployment server A still needs to be instructed to perform the snapshot operations on the VM1 and the VM2 at the consistent time points, and only in this way can the consistent snapshot operations on the VM1, the VM2 and the VM3 be implemented. Therefore, before the cloud operation server sends the snapshot instruction to a deployment server where at least two virtual machines are deployed, the snapshot instruction may further carry third information, where the third information is used to instruct the deployment server where the at least two virtual machines are deployed to start the snapshot operation on different virtual machines at the same time. For example, before sending the snapshot instruction to the deployment server A, the cloud operation server further makes the snapshot instruction carry the third information, so that the deployment server A can start the snapshot operations on the VM1 and the VM2 at the same time according to the third information.

An identifier of the virtual machine may be a universally unique identifier (UUID) of the virtual machine, and may also be a uniform resource name (URN) of the virtual machine, which is not limited by the embodiment of the present invention.

In addition, in the embodiment of the present invention, the cloud operation server performs consistent snapshots on the data of the APP1 according to the instruction information carried in the request for creating a snapshot for the application APP1. Certainly, the request for creating a snapshot for the application APP1 may not carry the instruction information and the user or the backup server may preset a snapshot policy of the application for the cloud operation server, so as to instruct that the consistent snapshot operations be performed on the data of the APP1. After receiving the request for creating a snapshot for the application APP1, the cloud operation server may perform the consistent snapshot operations on the data of the VM1, the VM2 and the VM3 according to the instruction of the snapshot policy of the application.

S806: The deployment server A and the deployment server B separately generate the snapshot files of the VM1, the VM2 and the VM3 at the consistent time points according to the snapshot instruction.

By analyzing step S806, it can be known that the deployment server A and the deployment server B start the snapshot operations at the consistent time points after receiving the snapshot instruction, so as to generate the snapshot files at the consistent time points. The virtualization module of the deployment server A and the virtualization module of the deployment server B suspend write operations on the VM1, the VM2 and the VM3 at the consistent time points, that is, block all write access operations on the VM1, the VM2 and the VM3 at the consistent time points. At this time, data in the storage volumes of the VM1, the VM2 and the VM3 is at the consistent time points. Then, the virtualization module of the deployment server A and the virtualization module of the deployment server B may separately take snapshots on the storage volumes of the VM1, the VM2 and the VM3, so as to generate the snapshot files of the VM1, the VM2 and the VM3. Because input/output systems of the VM1, the VM2 and the VM3 are suspended at the consistent time points, the snapshot files at the consistent time points are generated for the VM1, the VM2 and the VM3, and consistency among backup data of the VM1, the VM2 and the VM3 is ensured.

S807: The deployment server A and the deployment server B return information about the snapshot files of the VM1, the VM2 and the VM3 to the cloud operation server.

After generating the snapshot files of the VM1, the VM2 and the VM3, the virtualization module of the deployment server A and the virtualization module of the deployment server B may separately send the information about the snapshot files of the VM1, the VM2 and the VM3 to the cloud operation server, where the information about the snapshot files is identifiers or paths of the snapshot files in the deployment servers, and obtain, according to the information about the snapshot files, the snapshot files from the deployment servers.

S808: The cloud operation server returns the received information about the snapshot files of the VM1, the VM2 and the VM3 to the backup server.

S809: The backup server generates the backup data of the VM1, the VM2 and the VM3 according to the information about the snapshot files of the VM1, the VM2 and the VM3.

The backup server may back up the snapshot files of the VM1, the VM2 and the VM3 to the backup server according to the information about the snapshot files of the VM1, the VM2 and the VM3, that is, generate the backup data of the VM1, the VM2 and the VM3. Because the snapshot files of the VM1, the VM2 and the VM3 is at consistent time points, the consistency among the backup data of the VM1, the VM2 and the VM3 is ensured. In the embodiment of the present invention, the backup server may send the snapshot creation request for the application, the cloud operation server may determine, according to the identifier of the application, the plurality of virtual machines where the application runs and send the snapshot instruction to the deployment servers of the plurality of virtual machines according to the instruction information carried in the snapshot creation request for the application, where the snapshot instruction carries the first information or the second information or the third information, so that the deployment servers of the plurality of virtual machines can start the snapshot operations on the plurality of virtual machines at the consistent time points according to the first information or the second information or the third information, so as to generate the snapshot files of the plurality of virtual machines at the consistent time points, and in this way, the backup server can take, according to the snapshot files of the plurality of virtual machines, unified snapshots on the plurality of virtual machines where the application runs, thereby ensuring the consistency among the backup data of the application. Different from the prior art where snapshot operations and data backup are performed with a granularity of a virtual machine, the embodiment of the present invention implements unified snapshots and backup on the virtual machines where the application runs, and avoids situations of inconsistent snapshot data and inconsistent backup data of virtual machines where a same application runs, which are possibly caused by a snapshot manner with the granularity of a virtual machine.

Specific Embodiment 2

Figure 9:
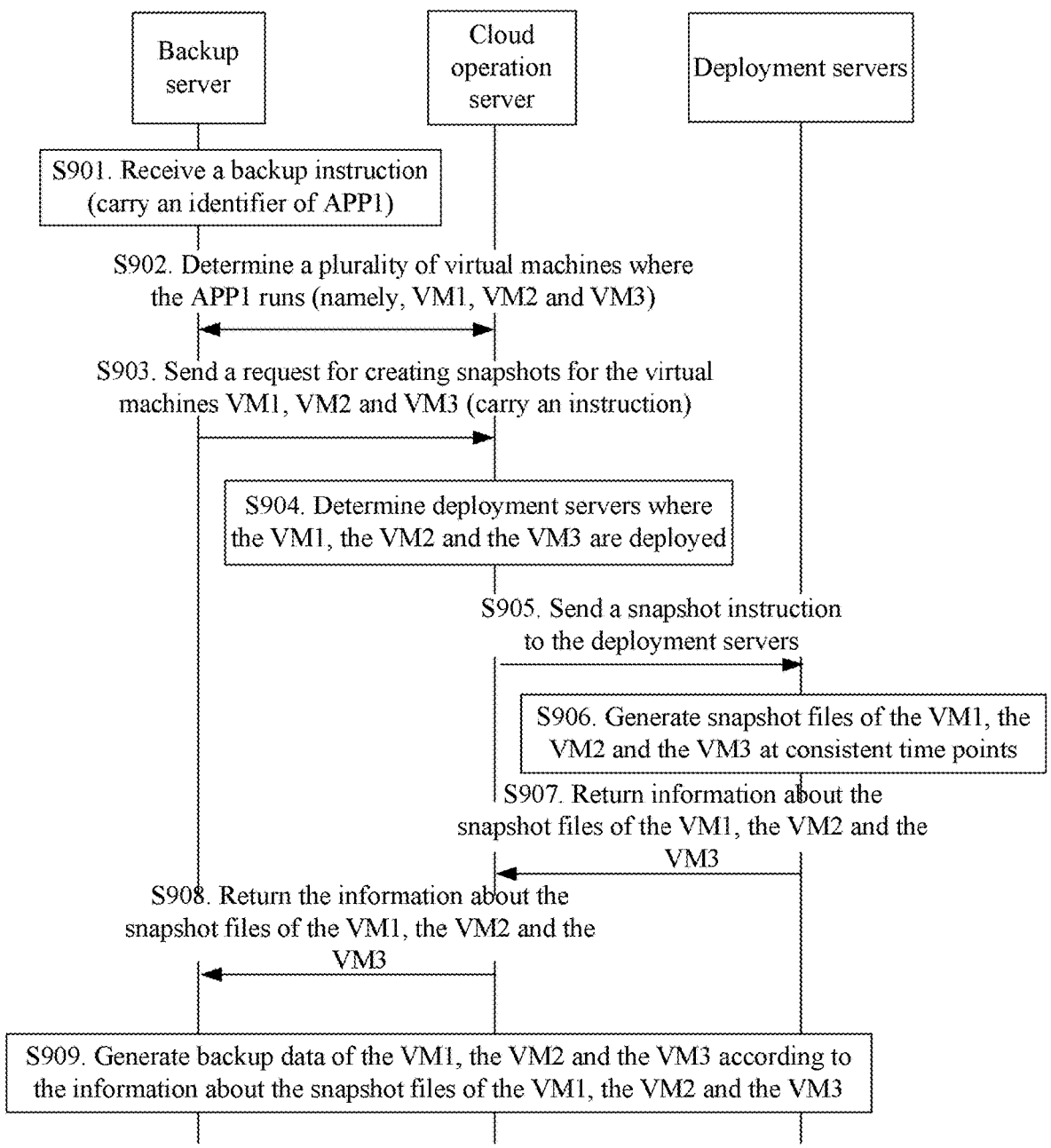
FIG. 9 is a flowchart of another snapshot generating method provided by an embodiment of the present invention.

With reference to the system architecture shown in FIG. 1A, an embodiment of the present invention provides a snapshot generating method. As shown in FIG. 9, the method is used to perform a snapshot operation on data of an application. For example, data of APP1 is to be backed up, where the APP1 runs on the VM1, the VM2, and the VM3, where the VM1 and the VM2 are deployed on the deployment server A, and the VM3 is deployed on the deployment server B. The method may include the following steps:

S901: The backup server receives a backup instruction, where the backup instruction carries an identifier of the APP1.

The backup instruction is used to instruct the backup server to back up the data of the APP1. A specific implementation manner of this step is similar to that of step S801 and will not be further described herein.

S902: The backup server queries, according to the identifier of the APP1, a plurality of virtual machines where the APP1 runs.

The backup server may query, after receiving the backup instruction, the cloud operation server for the plurality of virtual machines where the APP1 runs, so as to subsequently perform snapshot operations on the plurality of virtual machines.

After the APP1 is deployed in the system, the cloud operation server may collect configuration information of the APP1, for example, information about the virtual machines where the APP1 runs, and the backup server may query, according to the identifier of the APP1 using a cloud management interface, the cloud operation server for the plurality of virtual machines where the APP1 runs, so as to determine that the plurality of virtual machines where the APP1 runs is the VM1, the VM2 and the VM3.

S903: The backup server sends a request for creating snapshots for the virtual machines VM1, VM2 and VM3 to the cloud operation server.

The request for creating snapshots for the virtual machines VM1, VM2 and VM3 carries identifiers of the VM1, the VM2, and the VM3 and instruction information, where the instruction information is used to instruct the cloud operation server to perform consistent snapshot operations on data of the VM1, the VM2 and the VM3.

S904: The cloud operation server determines, according to the identifiers of the VM1, the VM2 and the VM3, deployment servers of the VM1, the VM2 and the VM3.

The cloud operation server may further determine the deployment servers of the VM1, the VM2 and the VM3, so as to subsequently instruct the deployment servers of the VM1, the VM2 and the VM3 to perform the consistent snapshot operations on the VM1, the VM2 and the VM3.

The cloud operation server may determine, according to the identifiers of the VM1, the VM2 and the VM3, that a deployment server where the VM1 and the VM2 are deployed is the deployment server A and that a deployment server where the VM3 is deployed is the deployment server B.

S905: The cloud operation server sends a snapshot instruction to the deployment server A and the deployment server B according to the instruction information.

S906: The deployment server A and the deployment server B separately generate snapshot files of the VM1, the VM2 and the VM3 at consistent time points according to the snapshot instruction.

S907: The deployment server A and the deployment server B return information about the snapshot files of the VM1, the VM2 and the VM3 to the cloud operation server.

S908: The cloud operation server returns the received information about the snapshot files of the VM1, the VM2 and the VM3 to the backup server.

S909: The backup server generates backup data of the VM1, the VM2 and the VM3 according to the information about the snapshot files of the VM1, the VM2 and the VM3.

A specific implementation manner of steps S905 to S909 is similar to that of steps S805 to S809 and will not be further described in the embodiment of the present invention.

In the embodiment of the present invention, the backup server may determine, after receiving the backup instruction, the plurality of virtual machines where the application runs and send the snapshot creation request for the virtual machines, the cloud operation server may send the snapshot instruction to the deployment servers of the plurality of virtual machines according to the instruction information carried in the snapshot creation request for the virtual machines, where the snapshot instruction carries first information or second information or third information, so that the deployment servers of the plurality of virtual machines can start the snapshot operations on the plurality of virtual machines at the consistent time points according to the first information or the second information or the third information, so as to generate the snapshot files of the plurality of virtual machines at the consistent time points, and in this way, the backup server can perform, according to the snapshot files of the plurality of virtual machines, unified backup on the plurality of virtual machines where the application runs, thereby ensuring consistency among backup data of the application. Different from the prior art where snapshot operations and data backup are performed with a granularity of a virtual machine, the embodiment of the present invention implements unified snapshots and backup on the virtual machines where the application runs, and avoids situations of inconsistent snapshot data and inconsistent backup data of virtual machines where a same application runs, which may occur in the prior art.

Specific Embodiment 3

Figure 10:
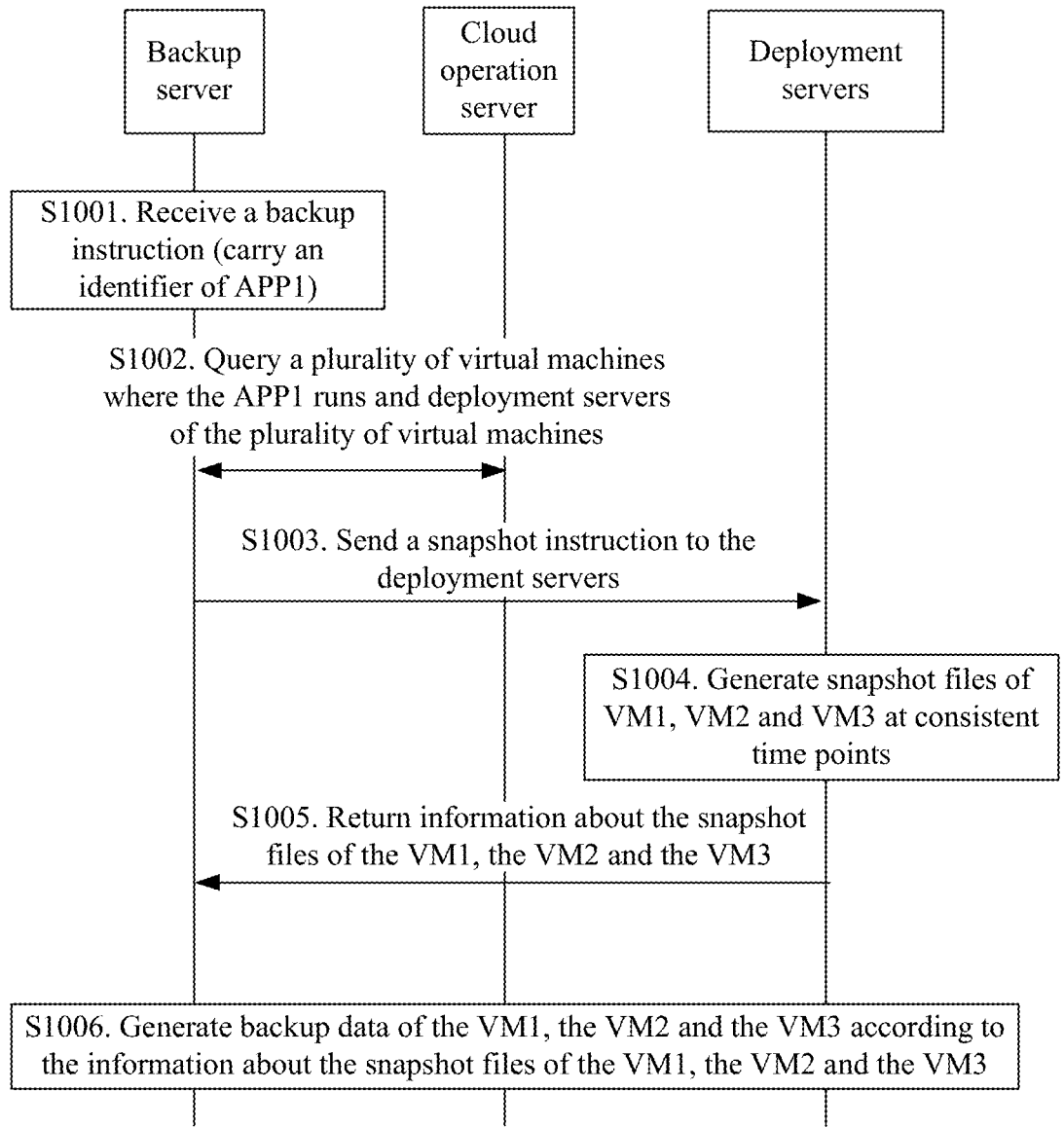
FIG. 10 is a flowchart of another snapshot generating method provided by an embodiment of the present invention.

With reference to the system architecture shown in FIG. 1B, an embodiment of the present invention provides a snapshot generating method. As shown in FIG. 10, the method is used to perform a snapshot operation on data of an application. For example, data of APP1 is to be backed up, where the APP1 runs on the VM1, the VM2, and the VM3, where the VM1 and the VM2 are deployed on the deployment server A, and the VM3 is deployed on the deployment server B. The method may include the following steps:

S1001: The backup server receives a backup instruction, where the backup instruction carries an identifier of the APP1.

The backup instruction is used to instruct the backup server to back up the data of the APP1. A specific implementation manner of this step is similar to that of step S801 and will not be further described herein.

S1002: The backup server queries, according to the identifier of the APP1, a plurality of virtual machines where the APP1 runs and deployment servers of the plurality of virtual machines.

The backup server may query, after receiving the backup instruction, the cloud operation server for the plurality of virtual machines where the APP1 runs and the deployment servers of the plurality of virtual machines, so as to subsequently instruct the deployment servers of the plurality of virtual machines to perform snapshot operations on the plurality of virtual machines.

After the APP1 is deployed in the system, the cloud operation server may collect configuration information of the APP1, for example, information about the virtual machines where the APP1 runs and the deployment servers of the virtual machines, and the backup server may query, according to the identifier of the APP1 using a cloud management interface, the cloud operation server for the plurality of virtual machines where the APP1 runs, so as to determine that the plurality of virtual machines where the APP1 runs is the VM1, the VM2, and the VM3, that the deployment server where the VM1 and the VM2 are deployed is the deployment server A, and that the deployment server where the VM3 is deployed is the deployment server B.

S1003: The backup server sends a snapshot instruction to the deployment server A and the deployment server B.

The backup server sends the snapshot instruction separately to the deployment server A and the deployment server B, so as to instruct the deployment server A and the deployment server B to perform consistent snapshot operations on data of the VM1, the VM2 and the VM3.

In order to implement the consistent snapshot operations on the data of the VM1, the VM2 and the VM3, the backup server may send the snapshot instruction separately to the deployment server A and the deployment server B at a same time point, where the snapshot instruction sent to the deployment server A carries identifiers of the VM1 and the VM2 and first information, and the snapshot instruction sent to the deployment server B carries an identifier of the VM3 and the first information, where the first information is used to instruct that the snapshot operation be performed immediately after the snapshot instruction is received, that is, used to indicate that the snapshot operation has a high processing priority, and in this way, the deployment server A and the deployment server B can receive the snapshot instruction at consistent time points, and start the snapshot operation at the consistent time points according to the first information; or, it may further be that, the backup server may send the snapshot instruction separately to the deployment server A and the deployment server B, where the snapshot instruction sent to the deployment server A carries identifiers of the VM1 and the VM2 and second information, and the snapshot instruction sent to the deployment server B carries an identifier of the VM3 and the second information, where the second information is used to instruct that the snapshot operation be started at a same time, for example, the second information may instruct that the snapshot operation be started at 4:00 pm on a current day. Then, the deployment server A and the deployment server B start the snapshot operation at the same time according to the second information.

Using the above two manners, it is ensured that the deployment server A and the deployment server B start the snapshot operations at the same time. However, because two virtual machines, that is, the VM1 and the VM2, are deployed on the deployment server A, the deployment server A still needs to be instructed to perform the snapshot operations on the VM1 and the VM2 at the same time, and only in this way can the consistent snapshot operations on the VM1, the VM2 and the VM3 be implemented. Therefore, before the backup server sends the snapshot instruction to a deployment server where at least two virtual machines are deployed, the snapshot instruction may further carry third information, where the third information is used to instruct the deployment server where the at least two virtual machines are deployed to start the snapshot operation on different virtual machines at the same time. For example, before sending the snapshot instruction to the deployment server A, the backup server further makes the snapshot instruction carry the third information, so that the deployment server A can start the snapshot operations on the VM1 and the VM2 at the same time according to the third information.

S1004: The deployment server A and the deployment server B separately generate snapshot files of the VM1, the VM2 and the VM3 at a same moment according to the snapshot instruction.

A specific implementation manner of this step is similar to that of step S806 and will not be further described in the embodiment of the present invention.

S1005: The deployment server A and the deployment server B return information about the snapshot files of the VM1, the VM2 and the VM3 to the backup server.

S1006: The backup server generates backup data of the VM1, the VM2 and the VM3 according to the information about the snapshot files of the VM1, the VM2 and the VM3.

The backup server may back up the snapshot files of the VM1, the VM2 and the VM3 to the backup server according to the information about the snapshot files of the VM1, the VM2 and the VM3. Because the snapshot files of the VM1, the VM2 and the VM3 are generated at the same moment, consistency among the backup data of the VM1, the VM2 and the VM3 is ensured.

In the embodiment of the present invention, the backup server may determine, after receiving the backup instruction, the plurality of virtual machines where the application runs and the deployment servers where the plurality of virtual machines is deployed, and send the snapshot instruction to the deployment servers of the plurality of virtual machines, where the snapshot instruction carries the first information or the second information or the third information, so that the deployment servers of the plurality of virtual machines can start the snapshot operations on the plurality of virtual machines at the consistent time points according to the first information or the second information or the third information, so as to generate the snapshot files of the plurality of virtual machines at the consistent time points, and in this way, the backup server can take, according to the snapshot files of the plurality of virtual machines, unified snapshots on the plurality of virtual machines where the application runs, thereby ensuring consistency among backup data of the application. Different from the prior art where snapshot operations and data backup are performed with a granularity of a virtual machine, the embodiment of the present invention implements unified snapshots and backup on the virtual machines where the application runs, and avoids situations of inconsistent snapshot data and inconsistent backup data of virtual machines where a same application runs, which are possibly caused by a snapshot manner with the granularity of a virtual machine.

Snapshot Generating Apparatus

Figure 11:
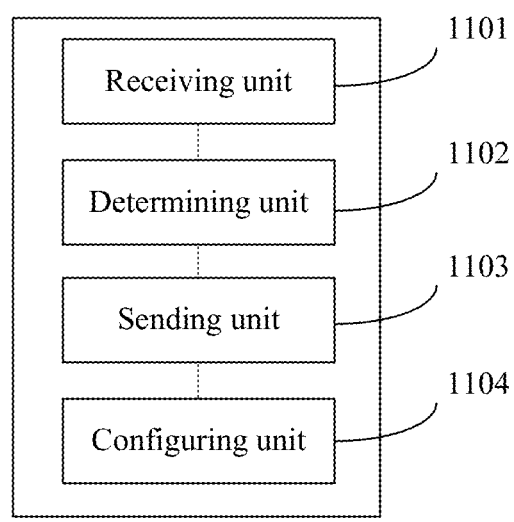
FIG. 11 is a composition diagram of a snapshot generating apparatus provided by an embodiment of the present invention.

With reference to the system architecture shown in FIG. 1A, an embodiment of the present invention provides a snapshot apparatus, and as shown in FIG. 11, the apparatus may include a receiving unit 1101, a determining unit 1102 and a sending unit 1103.

The receiving unit 1101 is configured to receive a snapshot creation request for an application, where the snapshot creation request for the application carries an identifier of the application and is used to instruct that a snapshot be created for data of the application. For example, the backup server may send a request for creating a snapshot for an application APP1 to the cloud operation server and the cloud operation server may receive the request for creating a snapshot for the application APP1 and start creation of the snapshot for the data of the APP1. The snapshot creation request for the application may further carry instruction information, where the instruction information is used to instruct that consistent snapshot operations be performed on the data of the application.

The determining unit 1102 is configured to determine, according to the identifier of the application carried in the snapshot creation request for the application, a plurality of virtual machines where the application runs and a deployment server of the plurality of virtual machines. Because, after deploying an application in the system, the cloud operation server may collect configuration information of the application, for example, information about the virtual machines where the application runs and information about the deployment server where the virtual machines are deployed, the determining unit 1102 may determine, according to the identifier of the application, the plurality of virtual machines where the application runs.

The sending unit 1103 is configured to send a snapshot instruction to the deployment server of the plurality of virtual machines, where the snapshot instruction is used to instruct that the consistent snapshot operations be performed on data of the plurality of virtual machines, so as to generate snapshot files of the plurality of virtual machines. The sending unit 1103 may send the snapshot instruction to the deployment server of the plurality of virtual servers according to the instruction information carried in the snapshot creation request for the application, so as to instruct the plurality of virtual machines to start the snapshot operations at consistent time points.

Further, the apparatus may further include a configuring unit 1104 configured to preset a snapshot policy of the application, where the snapshot policy of the application instructs that the consistent snapshot operations be performed on the data of the application, and the sending unit 1103 may send the snapshot instruction to the deployment server of the plurality of virtual machines according to the snapshot policy of the application preset by the configuring unit 1104, so as to instruct that the snapshot operations be started on the plurality of virtual machines at the consistent time points.

When the determining unit 1102 determines that the plurality of virtual machines is deployed on a plurality of deployment servers, in order to instruct the plurality of deployment servers to start the snapshot operations on the plurality of virtual machines at the consistent time points, the sending unit 1103 may send the snapshot instruction separately to the plurality of deployment servers at a same time point, where the snapshot instruction carries an identifier of a virtual machine deployed on each deployment server and first information, where the first information indicates that the snapshot operation has a high processing priority; or the sending unit 1103 may send the snapshot instruction separately to the plurality of deployment servers, where the snapshot instruction carries an identifier of a virtual machine deployed on each deployment server and second information, where the second information instructs that the snapshot operation be started at a same time, so as to ensure that the plurality of deployment servers starts the snapshot operations at the same time.

Further, when the determining unit 1102 determines that at least two virtual machines are deployed on at least one of the deployment servers, for example, when the determining unit 1102 determines that the VM1 and the VM2 are deployed on the deployment server A, in order to enable the deployment server A to start the snapshot operations on the VM1 and the VM2 at the same time, the sending unit 1103 may further send the snapshot instruction to the deployment server where the at least two virtual machines are deployed, where the snapshot instruction further carries third information, where the third information instructs the deployment server where the at least two virtual machines are deployed to start the snapshot operation on different virtual machines at the same time.

In the embodiment of the present invention, the determining unit 1102 may determine, according to the snapshot creation request for the application received by the receiving unit 1101, the plurality of virtual machines where the application runs and the deployment server where the plurality of virtual machines is deployed, so that the sending unit 1103 can send the snapshot instruction to the deployment server of the plurality of virtual machines, and in this way, the deployment server of the plurality of virtual machines can start the snapshot operations on the plurality of virtual machines at consistent time points according to the snapshot instruction, so as to generate the snapshot files of the plurality of virtual machines at the consistent time points, thereby implementing unified snapshots on the plurality of virtual machines where the application runs and ensuring consistency among snapshot data of the application. Different from the prior art where snapshot operations and data backup are performed with a granularity of a virtual machine, the embodiment of the present invention implements unified snapshots and backup on the virtual machines where the application runs, and avoids situations of inconsistent snapshot data and inconsistent backup data of virtual machines where a same application runs, which are possibly caused by a snapshot manner with the granularity of a virtual machine.

Figure 12:
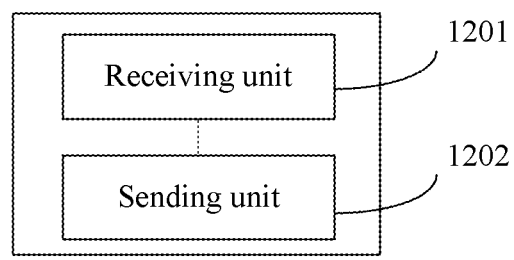
FIG. 12 is a composition diagram of another snapshot generating apparatus provided by an embodiment of the present invention.

With reference to the system architecture shown in FIG. 1A, an embodiment of the present invention provides a snapshot apparatus, and as shown in FIG. 12, the apparatus may be the backup server, and the apparatus may include a receiving unit 1201 and a sending unit 1202.

The receiving unit 1201 is configured to receive a backup instruction, where the backup instruction carries an identifier of the application and is used to instruct that data of the application be backed up. The backup instruction may be triggered by a user, and the receiving unit 1201 may back up the data of the application according to the backup instruction triggered by the user. The backup instruction may also be generated in a timed manner according to a backup policy of the application preset in the receiving unit 1201, so as to start backup of the data of the application.

The sending unit 1202 is configured to send a snapshot creation request for an application to the cloud operation server according to the backup instruction received by the receiving unit 1201, where the snapshot creation request for the application carries the identifier of the application and instruction information, where the instruction information is used to instruct that consistent snapshot operations be performed on the data of the application.

In the embodiment of the present invention, the sending unit 1202 may send the snapshot creation request for the application to the cloud operation server according to the backup instruction received by the receiving unit 1201, so that the cloud operation server can perform the consistent snapshot operations on the data of the application according to the instruction information carried in the snapshot creation request for the application, thereby implementing unified snapshots on the data of the application. Different from the prior art where snapshot operations and data backup are performed with a granularity of a virtual machine, the embodiment of the present invention implements unified snapshots and backup on the virtual machines where the application runs, and avoids situations of inconsistent snapshot data and inconsistent backup data of virtual machines where a same application runs, which are possibly caused by a snapshot manner with the granularity of a virtual machine.

Figure 13:
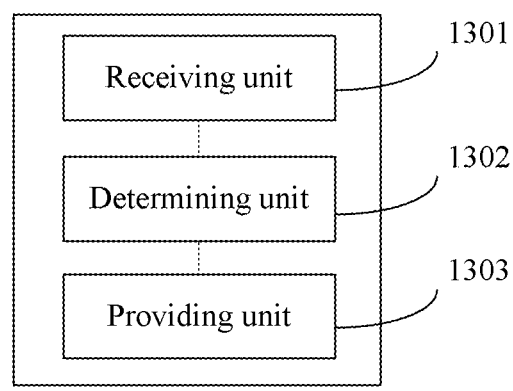
FIG. 13 is a composition diagram of another snapshot generating apparatus provided by an embodiment of the present invention.

With reference to the system architecture shown in FIG. 1A, an embodiment of the present invention provides a snapshot apparatus, and as shown in FIG. 13, the apparatus is configured to back up data of an application, and the apparatus may include a receiving unit 1301, a determining unit 1302 and a providing unit 1303.

The receiving unit 1301 is configured to receive a snapshot creation request for virtual machines, where the snapshot creation request for the virtual machines carries identifiers of a plurality of virtual machines and instruction information, where the instruction information is used to instruct that consistent snapshot operations be performed on data of the plurality of virtual machines. The identifiers of the plurality of virtual machines may be identifiers of all virtual machines where an application runs, and then the backup server may instruct, using the snapshot creation request for the virtual machines, the cloud operation server to start, at consistent time points, creation of snapshots for all virtual machines where an application runs.

The determining unit 1302 is configured to determine a deployment server of the plurality of virtual machines, so as to instruct the deployment server of the plurality of virtual machines to perform the snapshot operations on the plurality of virtual machines.

The providing unit 1303 is configured to send a snapshot instruction to the deployment server of the plurality of virtual machines, where the snapshot instruction is used to instruct that the consistent snapshot operations be performed on data of the plurality of virtual machines, so as to generate snapshot files of the plurality of virtual machines. In order to perform unified snapshot operations on the plurality of virtual machines, the providing unit 1303 may instruct, according to the instruction information using the snapshot instruction, the deployment server of the plurality of virtual servers to start the snapshot operations on the plurality of virtual machines at the consistent time points.

Because the plurality of virtual machines may be deployed on one deployment server or a plurality of deployment servers, when the determining unit 1302 determines that the plurality of virtual machines is deployed on a plurality of deployment servers, in order to instruct the plurality of deployment servers to start the snapshot operations on the plurality of virtual machines at the consistent time points, the providing unit 1303 may send the snapshot instruction separately to the plurality of deployment servers at a same time point, where the snapshot instruction carries an identifier of a virtual machine deployed on each deployment server and first information, where the first information indicates that the snapshot operation has a high processing priority; or the providing unit 1303 may send the snapshot instruction separately to the plurality of deployment servers, where the snapshot instruction carries an identifier of a virtual machine deployed on each deployment server and second information, where the second information instructs that the snapshot operation be started at a same time, so as to ensure that the plurality of deployment servers start the snapshot operations at the consistent time points.

Further, when the determining unit 1302 determines that at least two virtual machines are deployed on at least one of the deployment servers, for example, when the determining unit 1302 determines that the VM1 and the VM2 are deployed on the deployment server A, in order to enable the deployment server A to start the snapshot operations on the VM1 and the VM2 at the same time, the providing unit 1303 may further send the snapshot instruction to the deployment server where the at least two virtual machines are deployed, where the snapshot instruction further carries third information, where the third information instructs the deployment server where the at least two virtual machines are deployed to start the snapshot operation on different virtual machines at the same time.

In the embodiment of the present invention, the determining unit 1302 may determine, according to the snapshot creation request for the virtual machines received by the receiving unit 1301, the deployment server where the plurality of virtual machines is deployed, so that the providing unit 1303 may send the snapshot instruction to the deployment server of the plurality of virtual machines, and in this way, the deployment server of the plurality of virtual machines can start, according to the snapshot instruction, the snapshot operations on the plurality of virtual machines at the same time, so as to generate the snapshot files of the plurality of virtual machines at the consistent time points. When the plurality of virtual machines is all virtual machines where an application runs, the method can implement unified snapshots on all the virtual machines where the application runs and ensure consistency among snapshot data of the application. Different from the prior art where snapshot operations and data backup are performed with a granularity of a virtual machine, the embodiment of the present invention implements unified snapshots and backup on the virtual machines where the application runs, and avoids situations of inconsistent snapshot data and inconsistent backup data of virtual machines where a same application runs, which are possibly caused by a snapshot manner with the granularity of a virtual machine.

Figure 14:
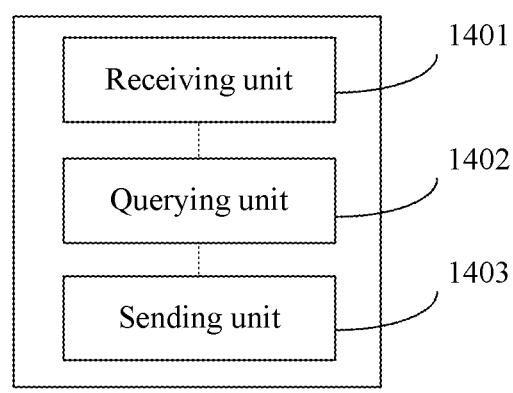
FIG. 14 is a composition diagram of another snapshot generating apparatus provided by an embodiment of the present invention.

With reference to the system architecture shown in FIG. 1A, an embodiment of the present invention provides a snapshot apparatus, and as shown in FIG. 14, the apparatus may be the backup server, and the apparatus may include a receiving unit 1401, a querying unit 1402 and a sending unit 1403.

The receiving unit 1401 is configured to receive a backup instruction, where the backup instruction carries an identifier of the application and is used to instruct that data of the application be backed up. The backup instruction may be triggered by a user, and the receiving unit 1401 may back up the data of the application according to the backup instruction triggered by the user. The backup instruction may also be generated in a timed manner according to a backup policy of the application preset in the receiving unit 1401, so as to start backup of the data of the application.

The querying unit 1402 is configured to determine, according to the identifier of the application, a plurality of virtual machines where the application runs. The querying unit 1402 may query, according to the identifier of the application, the cloud operation server to obtain identifiers of the plurality of virtual machines where the application runs.

The sending unit 1403 is configured to send a snapshot creation request for virtual machines to the cloud operation server, where the snapshot creation request for the virtual machines carries the identifiers of the plurality of virtual machines and instruction information, where the instruction information is used to instruct that consistent snapshot operations be performed on data of the plurality of virtual machines.

In the embodiment of the present invention, the querying unit 1402 may, after the receiving unit 1401 receives the backup instruction, determine the plurality of virtual machines where the application runs, and the sending unit 1403 may send the snapshot creation request for the virtual machines, so that the cloud operation server may perform, according to the snapshot creation request for the virtual machines, the consistent snapshot operations on the data of the plurality of virtual machines where the application runs, thereby implementing unified snapshots on the data of the plurality of virtual machines and ensuring consistency among backup data of the application. Different from the prior art where snapshot operations and data backup are performed with a granularity of a virtual machine, the embodiment of the present invention implements unified snapshots and backup on the virtual machines where the application runs, and avoids situations of inconsistent snapshot data and inconsistent backup data of virtual machines where a same application runs, which are possibly caused by a snapshot manner with the granularity of a virtual machine.

Figure 15:
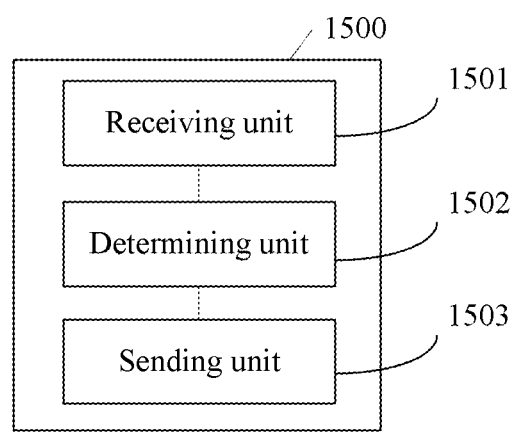
FIG. 15 is a composition diagram of another snapshot generating apparatus provided by an embodiment of the present invention.

With reference to the system architecture shown in FIG. 1B, an embodiment of the present invention provides a snapshot apparatus, and as shown in FIG. 15, the apparatus may be the backup server, and the apparatus may include a receiving unit 1501, a determining unit 1502 and a sending unit 1503.

The receiving unit 1501 is configured to receive a backup instruction, where the backup instruction carries an identifier of the application and is used to instruct that data of the application be backed up. For example, the backup instruction may be triggered by a user, and the backup instruction carries the identifier of the application and instruction information, where the instruction information is used to instruct that consistent snapshot operations be performed on data of the application, and the receiving unit 1501 is configured to receive the backup instruction triggered by the user. The backup instruction may also be generated in a timed manner according to a backup policy of the application preset in the receiving unit 1501.

The determining unit 1502 is configured to determine, according to the identifier of the application, a plurality of virtual machines where the application runs and a deployment server of the plurality of virtual machines. The determining unit 1502 queries the cloud operation server using a cloud management interface to determine the plurality of virtual machines where the application runs and the deployment server of the plurality of virtual machines.

The sending unit 1503 is configured to send, according to the instruction information carried in the backup instruction or a preset snapshot policy of the application, a snapshot instruction to the deployment server of the plurality of virtual machines, where the snapshot instruction is used to instruct that the consistent snapshot operations be performed on data of the plurality of virtual machines, so as to generate snapshot files of the plurality of virtual machines, where the snapshot policy of the application instructs that the consistent snapshot operations be performed on the data of the application.

Because the plurality of virtual machines may be deployed on one deployment server or a plurality of deployment servers, when the determining unit 1502 determines that the plurality of virtual machines is deployed on a plurality of deployment servers, in order to instruct the plurality of deployment servers to start the snapshot operations on the plurality of virtual machines at consistent time points, the sending unit 1503 may send the snapshot instruction separately to the plurality of deployment servers at a same time point, where the snapshot instruction carries an identifier of a virtual machine deployed on each deployment server and first information, where the first information indicates that the snapshot operation has a high processing priority; or the sending unit 1503 may send the snapshot instruction separately to the plurality of deployment servers, where the snapshot instruction carries an identifier of a virtual machine deployed on each deployment server and second information, where the second information instructs that the snapshot operation be started at a same time, so as to ensure that the plurality of deployment servers start the snapshot operations at the consistent time points.

Further, when the determining unit 1502 determines that at least two virtual machines are deployed on at least one of the deployment servers, for example, when the determining unit 1502 determines that the VM1 and the VM2 are deployed on the deployment server A, in order to enable the deployment server A to start the snapshot operations on the VM1 and the VM2 at the consistent time points, the sending unit 1503 may further send the snapshot instruction to the deployment server where the at least two virtual machines are deployed, where the snapshot instruction further carries third information, where the third information instructs the deployment server where the at least two virtual machines are deployed to start the snapshot operation on different virtual machines at a same time.

In the embodiment of the present invention, the determining unit 1502 may determine, according to the identifier of the application carried in the backup instruction, the plurality of virtual machines where the application runs and the deployment server where the plurality of virtual machines is deployed, and the sending unit 1503 may send the snapshot instruction to the deployment server of the plurality of virtual machines, so that the deployment server of the plurality of virtual machines can start the snapshot operations on the plurality of virtual machines at consistent time points according to the snapshot instruction, so as to generate the snapshot files of the plurality of virtual machines at the consistent time points, thereby implementing unified snapshots on the plurality of virtual machines where the application runs and ensuring consistency among snapshot data of the application. Different from the prior art where snapshot operations and data backup are performed with a granularity of a virtual machine, the embodiment of the present invention implements unified snapshots and backup on the virtual machines where the application runs, and avoids situations of inconsistent snapshot data and inconsistent backup data of virtual machines where a same application runs, which are possibly caused by a snapshot manner with the granularity of a virtual machine.

Figure 16:
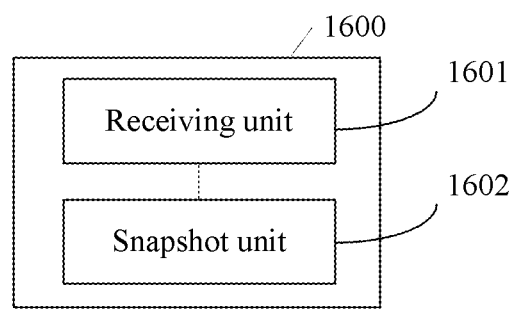
FIG. 16 is a composition diagram of another snapshot generating apparatus provided by an embodiment of the present invention.

With reference to the system architecture shown in FIG. 1A or FIG. 1B, an embodiment of the present invention provides a snapshot apparatus, and as shown in FIG. 16, the apparatus may be the deployment server, and the apparatus may include a receiving unit 1601 and a snapshot unit 1602.

The receiving unit 1601 is configured to receive a snapshot instruction, where the snapshot instruction is used to instruct that consistent snapshot operations be performed on a plurality of virtual machines. The snapshot unit 1602 is configured to suspend a write operation on each virtual machine at a consistent time point according to the snapshot instruction, and take a snapshot on a storage volume of each virtual machine, so as to generate a snapshot file of each virtual machine. The snapshot instruction may carry identifiers of the virtual machines and first information, where the first information indicates that the snapshot operation has a high processing priority, or the snapshot instruction carries identifiers of the virtual machines and second information, where the second information instructs that the snapshot operation be started at a same time, or the snapshot instruction may further carry third information, where the third information instructs that the snapshot operation be started on different virtual machines at a same moment, so that the snapshot unit 1602 can suspend, according to the first information, or the second information, or the third information, a write operation on each virtual machine at the consistent time point. Because, at this time, virtual machine data stored in the storage volumes of each virtual machines is at consistent time points, that the snapshot unit 1602 takes a snapshot on the storage volume of each virtual machine, thereby implementing the consistent snapshot operations on the VM1 and the VM2.

In the embodiment of the present invention, the receiving unit 1601 may receive the snapshot instruction, where the snapshot instruction carries the identifiers of the plurality of virtual machines, and the snapshot unit 1602 may suspend the write operations on the plurality of virtual machines at the consistent time points according to the snapshot instruction, and then, perform the consistent snapshot operations on the plurality of virtual machines, thereby implementing unified snapshots on the plurality of virtual machines and ensuring consistency among snapshot data of the plurality of virtual machines.

An embodiment of the present invention provides a snapshot generating system, and as shown in FIG. 1A, the system includes a backup server 102, a cloud operation server 101 and a deployment server cluster 110.

The backup server 102 is configured to send a snapshot creation request for an application to the cloud operation server 101, where the snapshot creation request for the application carries an identifier of the application and is used to instruct the cloud operation server 101 to create a snapshot for data of the application.

The cloud operation server 101 is configured to receive the snapshot creation request for the application and determine, according to the identifier of the application, a plurality of virtual machines where the application runs, determine the deployment server cluster 110 of the plurality of virtual machines, and send a snapshot instruction to the deployment server cluster 110 of the plurality of virtual machines, where the snapshot instruction is used to instruct the deployment server cluster 110 to perform consistent snapshot operations on data of the plurality of virtual machines, so as to generate snapshot files of the plurality of virtual machines.

The deployment server cluster 110 is configured to receive the snapshot instruction sent by the cloud operation server 101, suspend a write operation on each virtual machine at a consistent time point according to the snapshot instruction, and take a snapshot on a storage volume of each virtual machine, so as to generate a snapshot file of each virtual machine.

In the embodiment of the present invention, the backup server 102 may send the snapshot creation request for the application, the cloud operation server 101 may determine, according to the identifier of the application, the plurality of virtual machines where the application runs and send the snapshot instruction to the deployment server cluster 110 of the plurality of virtual machines according to the instruction information carried in the snapshot creation request for the application, so that the deployment server cluster 110 of the plurality of virtual machines can suspend the write operation on each virtual machine at the consistent time point according to the snapshot instruction, so as to generate the snapshot files of the plurality of virtual machines at the consistent time points, and in this way, the backup server 102 can perform, according to the snapshot files of the plurality of virtual machines, unified snapshot operations on the plurality of virtual machines where the application runs, thereby ensuring consistency among backup data of the application. Different from the prior art where snapshot operations and data backup are performed with a granularity of a virtual machine, the embodiment of the present invention implements unified snapshots and backup on the virtual machines where the application runs, and avoids situations of inconsistent snapshot data and inconsistent backup data of virtual machines where a same application runs, which are possibly caused by a snapshot manner with the granularity of a virtual machine.

An embodiment of the present invention provides a snapshot generating system, and as shown in FIG. 1A, the system includes a backup server 102, a cloud operation server 101 and a deployment server cluster 110

The backup server 102 is configured to receive a backup instruction, where the backup instruction carries an identifier of the application and is used to instruct that data of the application be backed up, query the cloud operation server 101 according to the identifier of the application, so as to determine a plurality of virtual machines where the application runs, and send a snapshot creation request for virtual machines to the cloud operation server 101, where the snapshot creation request for the virtual machines carries identifiers of the plurality of virtual machines and instruction information, where the instruction information is used to instruct that consistent snapshot operations be performed on data of the plurality of virtual machines.

The cloud operation server 101 is configured to determine, according to the identifier of the application carried in query information of the backup server 102, the identifiers of the plurality of virtual machines where the application runs, receive the snapshot creation request for the virtual machines which is sent by the backup server 102, determine the deployment server cluster 110 of the plurality of virtual machines, and send a snapshot instruction to the deployment server cluster 110 of the plurality of virtual machines according to the instruction information carried in the snapshot creation request for the virtual machines, where the snapshot instruction is used to instruct the deployment server cluster 110 to perform the consistent snapshot operations on data of the plurality of virtual machines, so as to generate snapshot files of the plurality of virtual machines.

The deployment server cluster 110 is configured to receive the snapshot instruction sent by the cloud operation server 101, suspend a write operation on each virtual machine at a consistent time point according to the snapshot instruction, and take a snapshot on a storage volume of each virtual machine, so as to generate a snapshot file of each virtual machine.

In the embodiment of the present invention, the backup server 102 may determine, after receiving the backup instruction, the plurality of virtual machines where the application runs and send the snapshot creation request for the virtual machines, the cloud operation server 101 may send the snapshot instruction to the deployment server cluster 110 of the plurality of virtual machines according to the instruction information carried in the snapshot creation request for the virtual machines, so that the deployment server cluster 110 of the plurality of virtual machines can suspend the write operations on the plurality of virtual machines at the consistent time points and starts the snapshot operations on the plurality of virtual machines according to the snapshot instruction, so as to generate the snapshot files of the plurality of virtual machines at the consistent time points, and in this way, the backup server 102 can perform, according to the snapshot files of the plurality of virtual machines, unified backups on the plurality of virtual machines where the application runs, thereby ensuring consistency among backup data of the application. Different from the prior art where snapshot operations and data backup are performed with a granularity of a virtual machine, the embodiment of the present invention implements unified snapshots and backup on the virtual machines where the application runs, and avoids situations of inconsistent snapshot data and inconsistent backup data of virtual machines where a same application runs, which may occur in the prior art.

An embodiment of the present invention provides a snapshot generating system, and as shown in FIG. 1B, the system includes a cloud operation server 101, a backup server 102 and a deployment server cluster 110.

The backup server 102 is configured to receive a backup instruction, where the backup instruction carries an identifier of the application and is used to instruct that data of the application be backed up, query the cloud operation server 101 according to the identifier of the application, so as to determine a plurality of virtual machines where the application runs and the deployment server cluster 110 of the plurality of virtual machines, and send a snapshot instruction to the deployment server cluster 110 of the plurality of virtual machines, where the snapshot instruction is used to instruct the deployment server cluster 110 to perform consistent snapshot operations on data of the plurality of virtual machines, so as to generate snapshot files of the plurality of virtual machines.

The cloud operation server 101 is configured to determine, according to the identifier of the application carried in query information of the backup server 102, the plurality of virtual machines where the application runs and the deployment server cluster 110 of the plurality of virtual machines.

The deployment server cluster 110 is configured to receive the snapshot instruction sent by the backup server 102, suspend a write operation on each virtual machine at a consistent time point according to the snapshot instruction, and take a snapshot on a storage volume of each virtual machine, so as to generate a snapshot file of each virtual machine.

In the embodiment of the present invention, the backup server 102 may determine, after receiving the backup instruction, the plurality of virtual machines where the application runs and the deployment server cluster 110 where the plurality of virtual machines are deployed, and send the snapshot instruction to the deployment server cluster 110 of the plurality of virtual machines, and the deployment server cluster 110 of the plurality of virtual machines can start the snapshot operations on the plurality of virtual machine at the consistent time points according to the snapshot instruction, so as to generate the snapshot files of the plurality of virtual machine at consistent time points, and in this way, the backup server 102 can perform, according to the snapshot files of the plurality of virtual machines, unified snapshots on the plurality of virtual machines where the application runs, thereby ensuring consistency among backup data of the application. Different from the prior art where snapshot operations and data backup are performed with a granularity of a virtual machine, the embodiment of the present invention implements unified snapshots and backup on the virtual machines where the application runs, and avoids situations of inconsistent snapshot data and inconsistent backup data of virtual machines where a same application runs, which are possibly caused by a snapshot manner with the granularity of a virtual machine.

Figure 17:
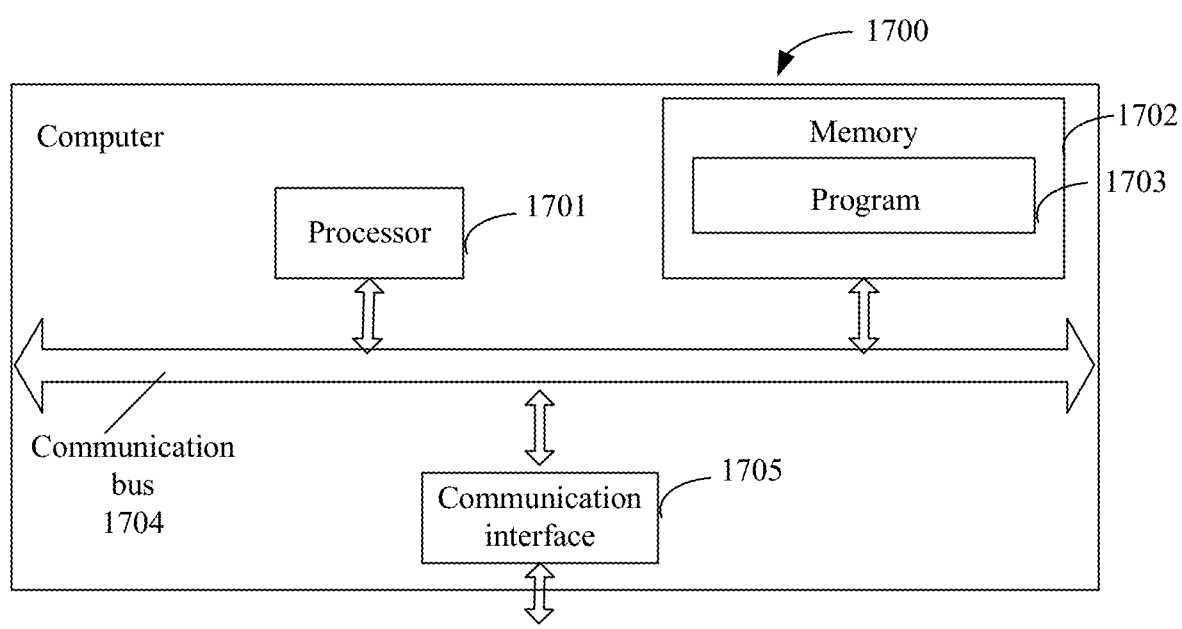
FIG. 17 is a composition diagram of another snapshot generating apparatus provided by an embodiment of the present invention.

FIG. 17 is a schematic structural diagram of a snapshot generating apparatus 1700 provided by an embodiment of the present invention. The snapshot generating apparatus 1700 provided by the embodiment of the present invention may include a processor 1701, a memory 1702, a system/communication bus 1704, and a communication interface 1705. The processor 1701, the memory 1702 and the communication interface 1705 are connected and implement mutual communication using the system/communication bus 1704.

The processor 1701 may be a single-core or multi-core central processing unit or a specific integrated circuit, or be configured to one or more integrated circuits that implement the embodiments of the present invention.

The memory 1702 may be a high-speed random access memory (RAM), or may be a non-volatile memory, for example, at least one magnetic disk memory.

The memory 1702 is configured to store a computer executable instruction/program 1703. The computer executable instruction/program 1703 may include a program code.

When the snapshot generating apparatus runs, the processor 1701 runs the computer executable instruction/program 1703 and can execute the method process shown in any one of FIG. 2 to FIG. 10.

A person skilled in the art understands that each aspect of the present invention or possible implementation manners of each aspect may be implemented as a system, a method or a computer program product. Therefore, each aspect of the present invention or the possible implementation manners of each aspect may be in a form of an all-hardware embodiment, an all-software embodiment (including firmware, resident programs and the like), or an embodiment combining software and hardware, which are collectively referred to as a "circuit", "module" or "system". In addition, each aspect of the present invention or the possible implementation manners of each aspect may be in a form of a computer program product, where the computer program product refers to computer readable program code stored in a computer readable medium.

The computer readable medium may be a computer readable signal medium or a computer readable storage medium. The computer readable storage medium includes but is not limited to an electronic, magnetic, optic, electromagnetic, infrared or semiconductor system, device, or apparatus, or any appropriate combination of the foregoing, such as a RAM, a read-only memory (ROM), an erasable programmable read-only memory (EPROM or flash memory), an optical fiber, or a portable read-only memory (CD-ROM).

A processor in a computer reads the computer readable program code stored in the computer readable medium, so that the processor can execute a function and an action defined in each step or a combination of the steps in the flowcharts; and generate an apparatus that implements a function and an action defined in each block or a combination of the blocks in the block diagrams.

The computer readable program code may be totally executed on a computer of a user or partially executed on a computer of a user, may be an independent software pack, may be partially on a computer of a user and partially on a remote computer, or may be totally executed on a remote computer or server. It should also be noted that, in some substitute implementation schemes, the steps in the flowcharts or functions indicated for the blocks in the block diagrams are possibly not performed in the sequence marked in the figures. For example, depending on the functions involved, two steps or two blocks shown successively may possibly be executed at approximately the same time, or some blocks are sometimes likely to be executed in a reversed sequence.

A person of ordinary skill in the art may be aware that units and algorithm steps described with reference to the examples in the embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for generating a snapshot for an application, comprising:
receiving, by a cloud operation server, a snapshot creation request for the application, the snapshot creation request for the application carrying an identifier of the application, and the snapshot creation request indicating a need to create a snapshot for data of the application;
identifying, by the cloud operation server, a plurality of virtual machines running the application;
determining, by the cloud operation server, a plurality of deployment servers hosting the plurality of virtual machines; and
sending, by the cloud operation server, a snapshot instruction to each of the plurality of deployment servers, the snapshot instruction carrying an identifier of the virtual machines deployed on each deployment server respectively, and the snapshot instruction instructing the deployment servers to suspend write operation on the virtual machines and instructing the plurality of deployment servers to perform consistent snapshot operations on data of the virtual machines approximately at a same time, wherein the consistent snapshot operations are performed for unified snapshot operations on the virtual machines to ensure consistency among snapshot data of the virtual machines.

2. The method according to claim 1, wherein the snapshot creation request for the application further carries instruction information to perform consistent snapshot operations on the data of the application, and wherein the snapshot instruction is sent to each of the plurality of deployment servers according to the instruction information.

3. The method according to claim 1, further comprising presetting a snapshot policy of the application, wherein the consistent snapshot operations are performed on the data of the application according to the snapshot policy, and wherein the snapshot instruction is sent to each of the plurality of deployment servers according to the snapshot policy of the application.

4. The method according to claim 1, further comprising:
receiving, by the cloud operation server, a snapshot creation request for virtual machines from a backup server, the snapshot creation request for the virtual machines carrying identifiers of the plurality of virtual machines running the application and instruction information, and the instruction information indicating a need to perform consistent snapshot operations on data of the plurality of virtual machines.

5. A system for generating a snapshot for an application, comprising:
a cloud operation server; and
a plurality of deployment servers in communication with the cloud operation server,
wherein the cloud operation server is configured to:
receives a snapshot creation request for the application, the snapshot creation request for the application carrying an identifier of the application, and the snapshot creation request indicating a need to create a snapshot for data of the application;
identify a plurality of virtual machines running the application;
determine a plurality of deployment servers hosting the plurality of virtual machines; and
send a snapshot instruction to each of the plurality of deployment servers, the snapshot instruction carrying an identifier of the virtual machines deployed on each deployment server respectively, and the snapshot instruction instructing the deployment servers to suspend write operation on the virtual machines and instructing the plurality of deployment servers to perform consistent snapshot operations on data of the virtual machines approximately at a same time; and
wherein each of the deployment servers is configured to:
receive the snapshot instruction;
suspend write operation on the virtual machines of the application;
perform consistent snapshot operations on data of the virtual machines of the application approximately at a same time with other deployment servers, wherein the consistent snapshot operations are performed for unified snapshot operations on the virtual machines to ensure consistency among snapshot data of the virtual machines.

6. The system of claim 5, wherein the cloud operation server is further configured to:
receives a snapshot creation request for virtual machines from a backup server, the snapshot creation request for the virtual machines carrying identifiers of the plurality of virtual machines running the application and instruction information, and the instruction information indicating a need to perform consistent snapshot operations on data of the plurality of virtual machines.

7. A non-transitory computer readable medium storing instructions, which when executed by one or more processors, perform a method comprising:
receiving a snapshot creation request for the application, the snapshot creation request for the application carrying an identifier of the application, and the snapshot creation request indicating a need to create a snapshot for data of the application;
identifying a plurality of virtual machines running the application;
determining a plurality of deployment servers hosting the plurality of virtual machines; and
sending a snapshot instruction to each of the plurality of deployment servers, the snapshot instruction carrying an identifier of the virtual machines deployed on each deployment server respectively, and the snapshot instruction instructing the deployment servers to suspend write operation on the virtual machines and instructing the plurality of deployment servers to perform consistent snapshot operations on data of the virtual machines approximately at a same time and generate snapshot files of the plurality of virtual machines, wherein the consistent snapshot operations are performed for unified snapshot operations on the virtual machines to ensure consistency among snapshot data of the virtual machines.

8. The non-transitory computer readable medium of claim 7, wherein the method further comprising:

receiving a snapshot creation request for virtual machines from a backup server, the snapshot creation request for the virtual machines carrying identifiers of the plurality of virtual machines running the application and instruction information, and the instruction information indicating a need to perform consistent snapshot operations on data of the plurality of virtual machines.

* * * * *